(12) United States Patent
Dahl et al.

(10) Patent No.: US 6,896,088 B2
(45) Date of Patent: May 24, 2005

(54) OPERATION OF WHEELED WORK MACHINE

(75) Inventors: Jeffery A. Dahl, Lincoln, ND (US); Michael J. Henline, West Fargo, ND (US); Martin Carpenter, Fargo, ND (US)

(73) Assignee: Clark Equipment Company, Woodcliff Lake, NJ (US)

( * ) Notice: Subject to any disclaimer, the term of this patent is extended or adjusted under 35 U.S.C. 154(b) by 0 days.

(21) Appl. No.: 10/269,680

(22) Filed: Oct. 11, 2002

(65) Prior Publication Data

US 2003/0070859 A1 Apr. 17, 2003

Related U.S. Application Data

(60) Provisional application No. 60/329,119, filed on Oct. 12, 2001.

(51) Int. Cl.[7] .............................................. B60K 17/356
(52) U.S. Cl. ...................... 180/305; 180/308; 180/367
(58) Field of Search ................................ 180/305, 307, 180/308, 367; 701/53, 55, 56; 60/445, 446, 420

(56) References Cited

U.S. PATENT DOCUMENTS

| | | | | |
|---|---|---|---|---|
| 3,800,901 A | * | 4/1974 | Blomstrom et al. | 180/9.62 |
| 4,401,182 A | * | 8/1983 | Pollman | 180/242 |
| 4,546,847 A | * | 10/1985 | Abels | 180/307 |
| 5,299,421 A | * | 4/1994 | Ikari | 60/444 |
| 5,390,759 A | | 2/1995 | Gollner | 180/307 |
| 5,473,895 A | * | 12/1995 | Bausenhart et al. | 60/448 |
| 5,553,453 A | * | 9/1996 | Coutant et al. | 60/327 |
| 5,754,428 A | * | 5/1998 | Ishikawa | 701/55 |
| 5,873,427 A | * | 2/1999 | Ferguson et al. | 180/178 |
| 5,995,895 A | * | 11/1999 | Watt et al. | 701/50 |
| 5,996,342 A | * | 12/1999 | Khan et al. | 60/421 |
| 6,148,257 A | * | 11/2000 | Katakura et al. | 701/54 |
| 6,169,950 B1 | | 1/2001 | Parigger | 701/53 |
| 6,209,675 B1 | * | 4/2001 | Hayashi et al. | 180/307 |
| 6,260,647 B1 | * | 7/2001 | Calamari et al. | 180/179 |
| 6,413,185 B1 | * | 7/2002 | Baginski et al. | 475/208 |

FOREIGN PATENT DOCUMENTS

| | | |
|---|---|---|
| EP | 0 389 262 A2 | 3/1990 |
| WO | WO 02/46856 A1 | 6/2002 |

* cited by examiner

Primary Examiner—Christopher P. Ellis
Assistant Examiner—Brian Swenson
(74) Attorney, Agent, or Firm—Westman, Champlin & Kelly, P.A.

(57) ABSTRACT

The present invention includes a control system for, or methods of controlling a wheeled work machine to accommodate desired travel control. Acceleration and deceleration inputs are provided, as is a controller for controlling hydrostatic motors to achieve desired acceleration and deceleration profiles.

24 Claims, 15 Drawing Sheets

OPERATION OF WHEELED WORK MACHINE

The present application is based on and claims the benefit of U.S. provisional patent application Ser. No. 60/329,119, filed Oct. 12, 2001, the content of which is hereby incorporated by reference in its entirety.

BACKGROUND OF THE INVENTION

Although compact tractors, skid steer loaders and other types of wheeled work machines have enjoyed great success and are used throughout the world in a number of different applications, these machines are not well suited for all work environments. For example, compact tractors, while useful in some applications, frequently have a number of characteristics, which limit their usefulness in some applications. Typically, compact tractors have poor visibility to the front (i.e., toward the bucket). Compact tractors also typically have limited hydraulic systems for operation of attachments, and the attachments are frequently behind the operator, forcing the operator to turn around to see them. Further, for the operator of the compact tractor, entry/egress is often awkward or difficult and usually the tractor only provides seating for a single person. Also, compact tractors lack a cargo area, which severely limits their usefulness in many applications. Other common limitations of compact tractors include a relative lack of stability and the rough ride provided by many compact tractor designs.

Utility carts are another type of wheeled work machine, which have a number of characteristics that limit their usefulness in some applications. For example, utility carts do not have a loader option, and typically have limited or no attachment capability. Also, utility carts generally have limited, if any, onboard hydraulic systems for the operation of hydraulic attachments. Other typical characteristics of utility carts, which limit the applications in which they can be used, include a relatively large turning diameter and a limited ability to carry cargo. Utility carts are frequently low on power needed to pull equipment or carry cargo.

In many applications, a small turning diameter would be a beneficial feature of a wheeled work machine. However, many wheeled work machines, if not most, do not have small turning diameters. Thus, to change direction of travel, these machines need to stop, change direction, reorient the machine, and proceed in the intended direction. Typically, machines with front steerable wheels (for example, tractors and most utility vehicles) have to maintain a short wheelbase in order to maintain a small turning diameter, as wheelbase and turning diameter are inversely proportional. However, a short wheelbase has a negative effect by decreasing stability, lift capacity, operator area, cargo area, etc.

Most compact tractors maintain a relatively small turning diameter by turning the front wheels extremely sharply and generally by having a shorter wheelbase. Turning the wheels excessively sharp can be damaging to sensitive grounds such as lawns and turf areas. Further, even with a short wheelbase (and the disadvantages which result), the relatively small turning diameter of compact tractors may not be small enough for some applications. Most utility carts have a large turning diameter, which is unacceptable for many applications, due to the fact that they cannot turn the wheels as sharply as a typical tractor and that they require a longer wheelbase to place the operator seating, engine, cargo area, etc. A wheeled work machine which provides a small turning diameter without the disadvantages associated with the short wheelbase of tractors, would be a significant improvement in wheeled work machine applications.

Generally, wheeled work machines such as compact tractors, utility carts, and other types have numerous limitations, which prevent them from being suited for some applications. Some of these limitations are discussed above with reference to compact tractors and utility vehicles, but they may apply to other types of work machines as well. In addition to turning diameter characteristics, a common limitation in many wheeled work machines is a general inability to carry more than one person to a work site. Other limitations include an inability to carry cargo, poor visibility, lack of attachments such as a bucket or loader, low power, and instability, to name a few.

Skid steer loaders have proven to be highly useful in many applications. Skid steer loaders have features, which are often highly beneficial for certain work environments. For example, skid steer loaders can support a wide variety of work tools and attachments. Skid steer loaders can also be turned very sharply. Numerous other features of skid steer loaders provide these machines with highly advantageous capabilities. Although skid steer loaders have enjoyed great success and are used throughout the world in a number of different applications, the skid steer loader is not well suited for all work environments.

There is thus a continuing need for an improved wheeled work machine and controllers for, and methods of controlling such machines. A machine that addresses one, several or all of the deficiencies discussed above would be particularly advantageous.

SUMMARY OF THE INVENTION

The present invention includes a control system for, or methods of controlling a wheeled work machine to accommodate desired travel control. Acceleration and deceleration inputs are provided, as is a controller for controlling hydrostatic motors to achieve desired acceleration and deceleration profiles.

DETAILED DESCRIPTION OF THE PREFERRED EMBODIMENT

Overview of one Example of a Wheeled Work Machine

The present invention is directed to a control system and method for controlling a wheeled work machine, including acceleration, deceleration and braking control as well as speed control. An exemplary embodiment of a wheeled work machine 10 is illustrated in a number of the FIGS. which will be variously referred to herein as different aspects of the wheeled work machine are discussed. While the present invention deals with controlling a work machine, the exemplary embodiment of a work machine is discussed first for the sake of completeness.

Figure 1:
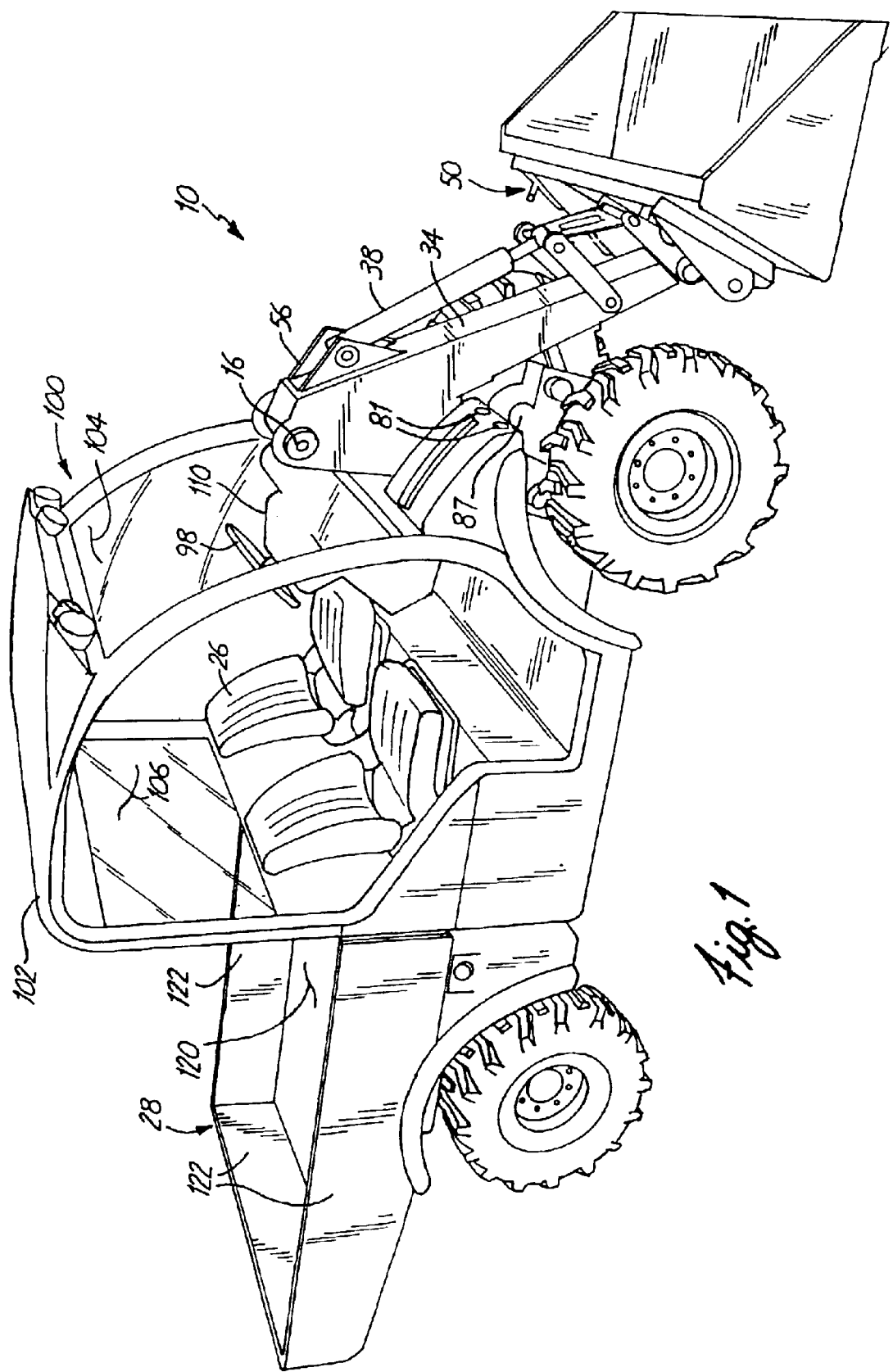
FIG. 1 is a perspective view of a wheeled work machine of the present invention.
Figure 2:
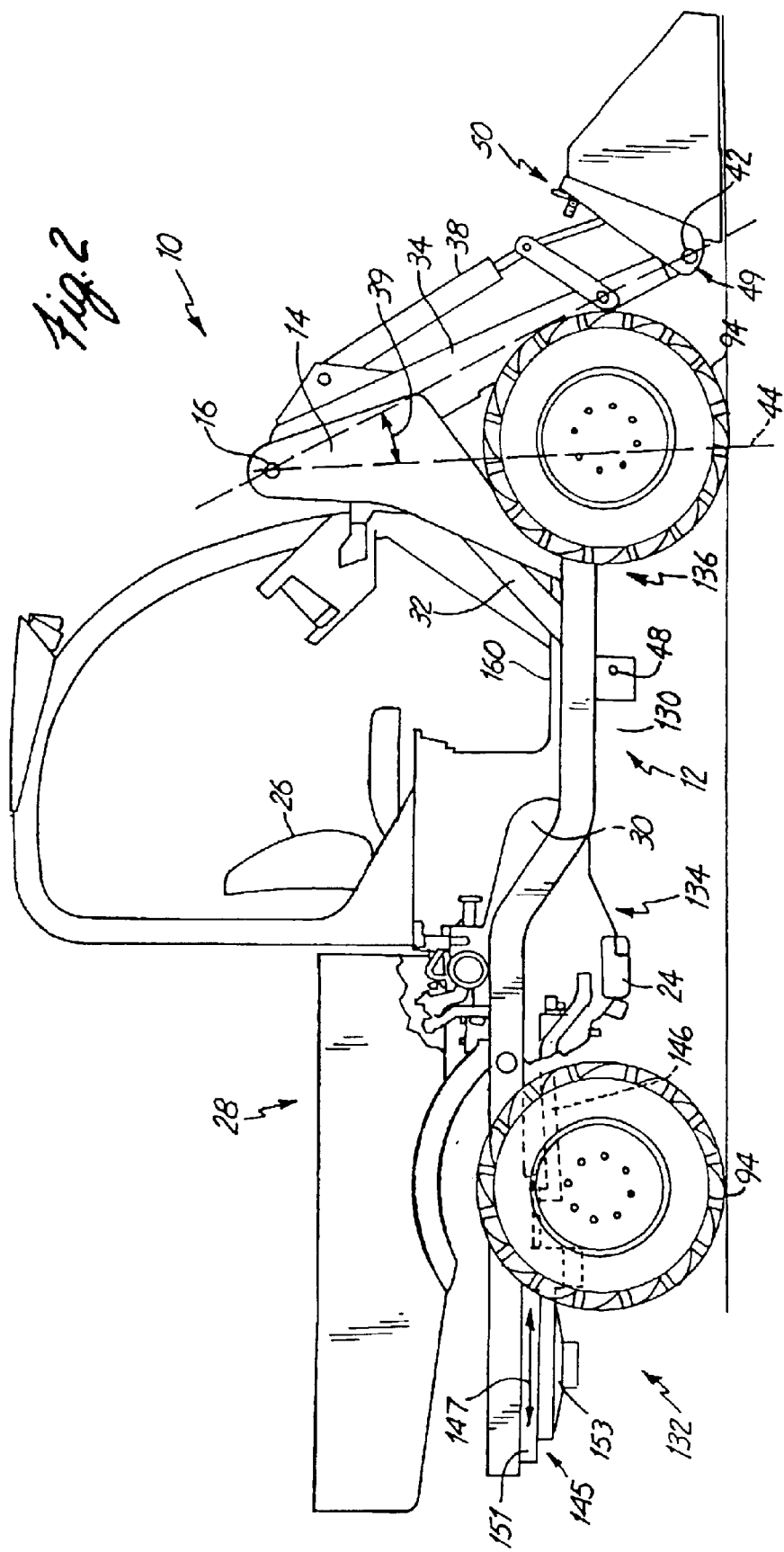
FIG. 2 is a side elevational view of the wheeled work machine with portions removed.
Figure 3:
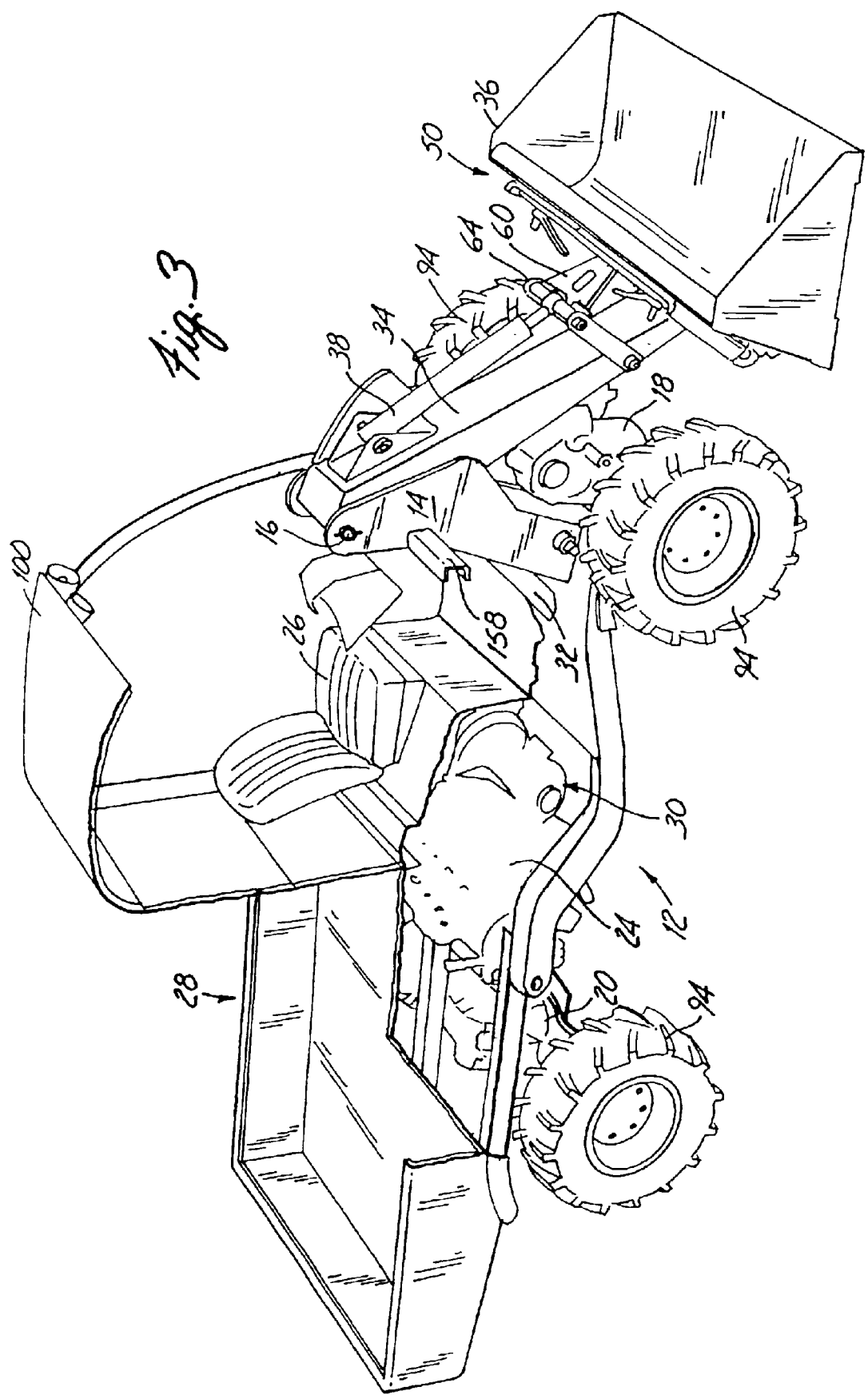
FIG. 3 is a perspective view of the wheeled work machine with portions removed.

An exemplary embodiment of a wheeled work machine 10 of the present invention is illustrated in FIGS. 1, 2 and 3. The wheeled work machine 10 includes a rigid frame assembly 12 having a support 14 with a boom pivot 16. A front wheel assembly 18 is joined to the frame assembly 12 proximate the support 14. Similarly, a rear wheel assembly 20 is joined to the frame assembly 12 at an end thereof remote from the support 14.

The wheeled work machine 10 further includes an engine 24, an operator platform 26 (herein embodied as a seat) and a cargo support 28.

Location of these elements in combination with the support 14 for the boom pivot 16 provides a unique, multi-purpose machine that is compact and usable in a number of different applications. In particular, the operator platform 26 is located behind the support 14 and between the boom pivot 16 and the engine 24. In addition, the cargo support 28, which is also supported by the frame assembly 12, is located behind the operator platform 26 and, in one embodiment, over at least a portion of the engine 24. In the embodiment illustrated, the engine 24 is coupled to a hydraulic pump 30, which in turn, is coupled to a lift cylinder 32. Under selective control by the operator, the lift cylinder 32 can be used to tilt a lift arm 34 that is pivotally coupled at the boom pivot 16. In a manner discussed below, various tools can be attached to the lift arm 34 to perform various work functions at a position convenient for forward viewing by the operator sitting in operator platform 26. For instance, as illustrated, a bucket 36 can be coupled to a remote end 49 of the lift arm 34 and used to scoop or lift various types of materials. As illustrated and discussed below, a tilt cylinder 38 can also be coupled between the lift arm 34 and the bucket 36, which allows the bucket 36 to be pivoted relative to the lift arm 34. It should be noted however that the bucket 36 is but one exemplary tool that can be used with the wheeled work machine 10. The wheeled work machine 10 can include a single lift arm or boom 34 pivotally joined to the boom pivot 16. Use of a single lift arm 34 provides a stable, strong lifting device, but also minimizes obstruction to the remote end of the lift arm 34 as viewed by the operator sitting in operator platform 26. Nevertheless, although illustrated as a single lift arm 34, those skilled in the art can appreciate that additional lift arms can be used, for instance, in a side-by-side relationship from the support or supports 14 disposed in front of the operator platform 26.

As illustrated, the lift arm 34 extends between a line between wheels of the front wheel assembly 18. In one embodiment, a minimum angle 39 formed between the boom pivot 16 and a second boom pivot 42 typically provided at a remote end of the lift arm 34 and a normal reference line 44 from the boom pivot 16 to a level ground surface is in the range of 20 to 35 degrees and in a further embodiment in the range of 22–28 degrees.

Using a rigid lift arm 34 between pivots 16 and 42 enables the bucket 36 to move forwardly during lifting from the initial angle 39 described above. The forward movement of the bucket 36 allows a less-experienced operator to easily fill the bucket 36 without requiring the wheeled work machine 10 to move forward during lifting. Due to the path taken by the bucket 36, the bucket 36 is filled during, approximately, the first 65 degrees of travel. Although many forms of loaders have the capability to raise a loaded bucket, many do not have the required traction or power to push the bucket completely into a pile of heavy material. Likewise, because many buckets lift primarily vertically, due to the long extension of the booms or lifting arms, many machines do not have the ability to lift a full bucket through the material that is above the bucket in view that that bucket was driven into the pile. In contrast, the large forward component of bucket movement during lifting enables the bucket 36 to be easily filled with rotation of the lift arm 34. In one embodiment, the lift arm 34 pivots through an arc of 102 degrees from its initial starting position. In this manner, once the bucket 36 is filled, the bucket 36 moves away from the pile of material. The use of a single boom support 14 and a single lift arm 34 is particularly beneficial because this construction enables a compact assembly of the work machine 10 and also provides excellent viewing of the remote end of the lift arm 34 for the operator sitting in the operator platform 26.

In a preferred embodiment, the height of the pivot 16 with respect to a level ground surface is in the range of 48 to 54 inches, for example, 50.94 when angle 39 is 27.5°. Other dimensions include the position of pivot 42 with respect to pivot 16 (55 to 49 inches, preferably 51.83 when angle 39 is 27.5°) and the height of pivot 42 above the ground (2 to 8 inches, preferably 5 inches when angle 39 is 27.5°). Similarly, the position of pivot 48 with respect to pivot 16 is in the range of 42.5 to 48.5 inches, preferably 45.5 when angle 39 is 27.5°, and the height of pivot 48 above the ground is in the range of 9 to 15 inches, preferably 12 when angle 39 is 27.5°. Likewise the position of the lift cylinder connection (pivot 47) to lift arm 34 with respect to pivot 16 is 13 to 19 inches, preferably 16 when angle 39 is 27.5°, while the length of the lift arm 34 (from pivot 16 to pivot 42) is also 49 to 55 inches, preferably 51.83 when angle 39 is 27.5°.

As discussed above, the lift cylinder 32 is operably coupled between the frame 12 and the lift arm 34 to pivot the lift arm 34. In a further embodiment, the remote end 49 (FIG. 6) of the lift arm is joined, for example, pivotally, to the frame assembly 12 between the wheel assemblies 18 and 20 to provide a compact assembly. In this manner, the front wheel assembly 18 is disposed between the lift arm 34 and the lift cylinder 32. Use of a single lift cylinder 32 in the center of the wheeled work machine 10 also minimizes any damage thereto.

In the embodiment illustrated, a quick attachment interface member or assembly 50 is provided at the remote end of the lift arm 34 forward of the operator platform 26, which is a far more convenient position of the tool at the end of the lift arm 34. The quick attachment interface 50 has been utilized extensively by Bobcat Company and sold under the trade name BOBTACH. The interface assembly 50 allows quick attachment of various work tools such as buckets, grapples, brooms, augers or the like. In this manner, by including the interface 50, the work machine 10 can readily accept and use all of the various types of work tools currently in use or developed in the future.

Figure 6:
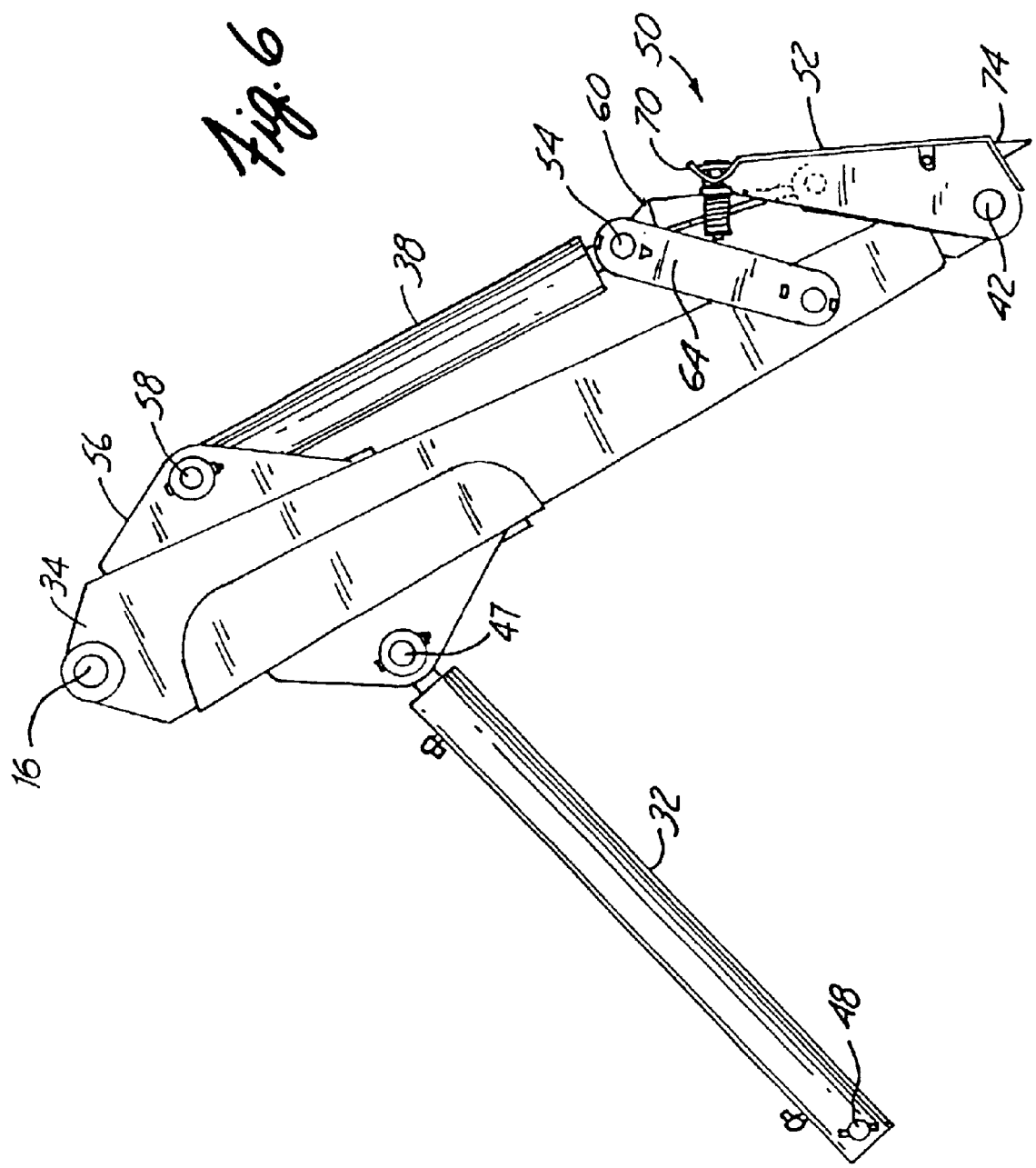
FIG. 6 is a side elevational view of a lift arm assembly.
Figure 7:
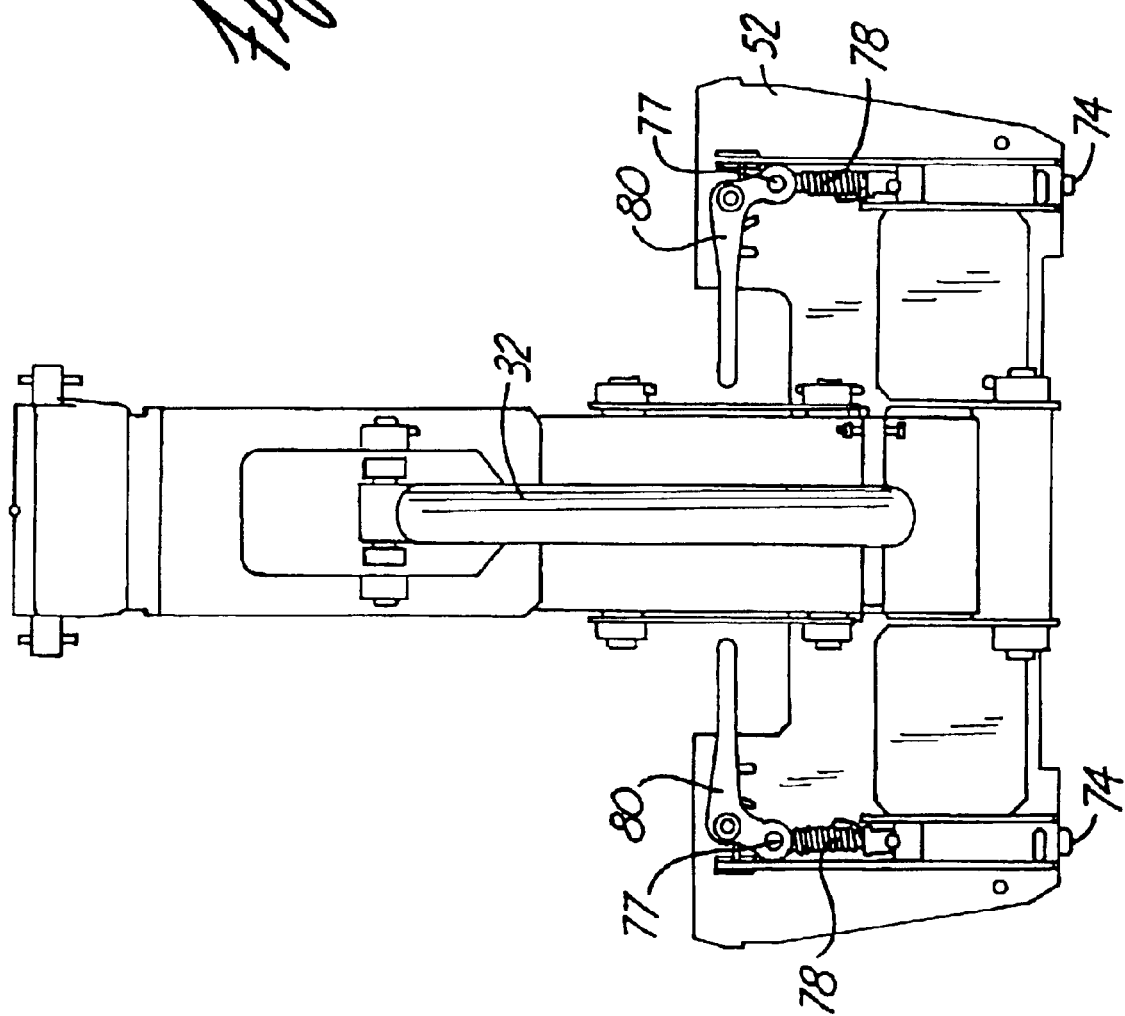
FIG. 7 is a rear elevational view of the lift arm assembly.
Figure 8:
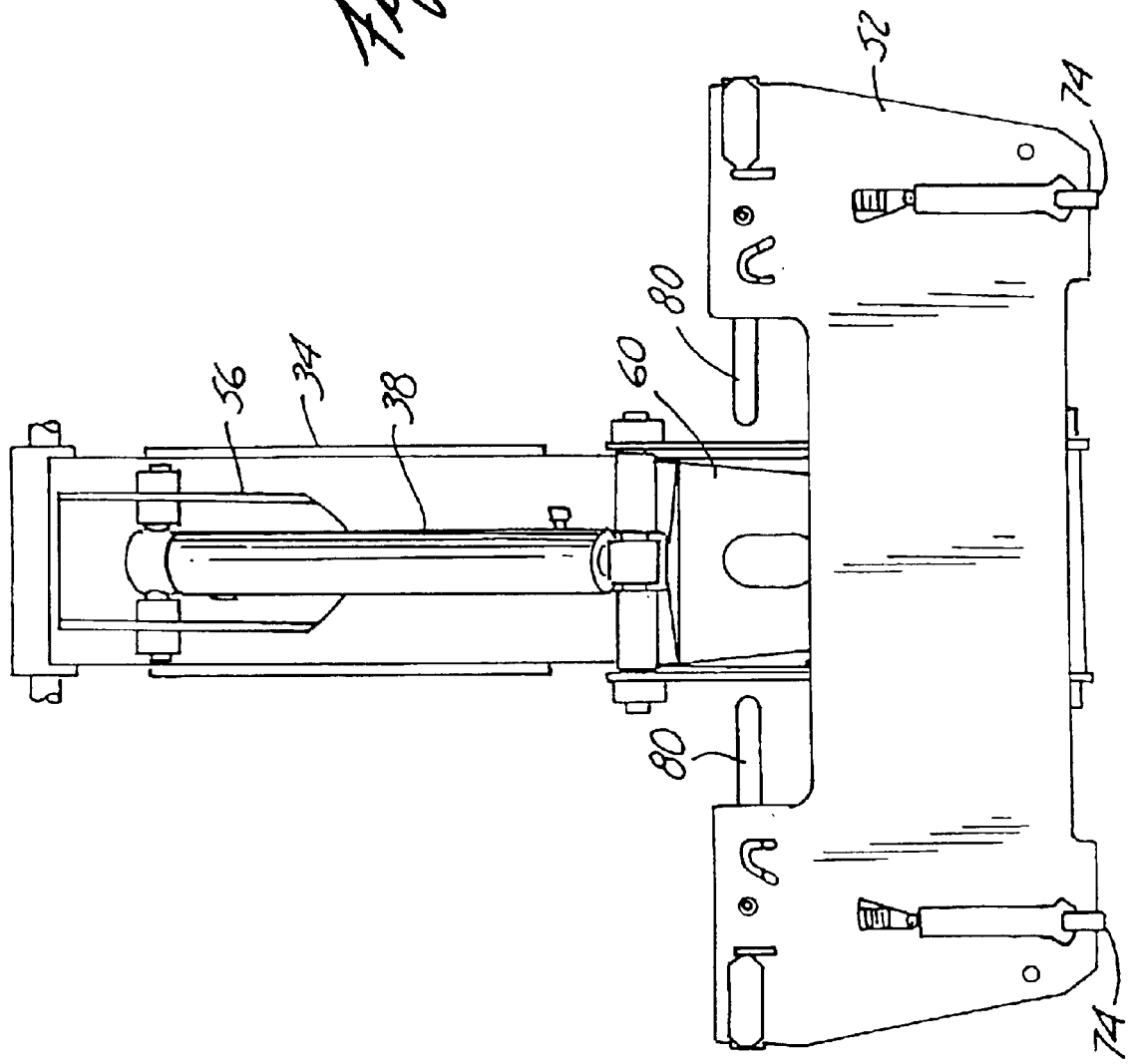
FIG. 8 is a front elevational view of the lift arm assembly.

Referring to FIGS. 6, 7 and 8, the interface 50 includes an attachment plate 52 pivotally attached to the second pivot 42. The tilting of the attachment plate 52 is controlled by the tilt cylinder 38, which is operably coupled between the lift arm 34 and the attachment plate 52. In the embodiment illustrated, a bracket 56 is provided with a pivot 58 to which an end of the tilt cylinder 38 is coupled. A second end 54 of the tilt cylinder 38 is operably coupled to the interface 50, and in the embodiment illustrated, through a link 60 that is pivotally coupled to the attachment plate 52. A standoff support 64 is also pivotally coupled to the lift arm 34 and to a common pivotal connection between the tilt cylinder 38 and the link 60.

Typically, the attachment plate 52 includes a lip 70 that will fit under a flange on an attachment or work tool such as the bucket 36. As is well known, apertures provided on the work tool will align with apertures of the attachment plate 52, or at least sliding wedges 74 provided on the attachment plate 52. The wedges 74 move linearly on the attachment plate 52. Typically, each of the wedges 74 have a tapered wedge end to aid in pushing the wedge into the desired aperture on the attachment plate 52 or work tool when it is in position to be mounted. A spring 78 joins each of the wedges 74 to a corresponding lever 80 that is pivotally connected to the attachment plate 52. The arrangement is conventional and the levers 80 and spring 78 will load each corresponding wedge 74 downward to lock the wedge 74 as well as upward in an unlocked position. An actuator end of each of the levers 80 carry pivot pins 77 for the springs 78. Handles are provided on each of the levers 80 in order to allow manual operation. A power actuator such as disclosed in U.S. Pat. No. 5,562,397 can also be provided, if desired.

Some work tools or attachments couplable to the interface 50 can be powered or operated hydraulically. The work machine 10 can include hydraulic couplings that are fluidly coupled to the pump 30 through suitable control valves or the like. The couplings can be provided at or near the interface 50 and/or proximate the support 14, for example, on the work machine body at 81 (FIG. 1). Likewise, if desired, hydraulic couplings can be provided at the rear of the work machine proximate the cargo support 28.

Figure 5:
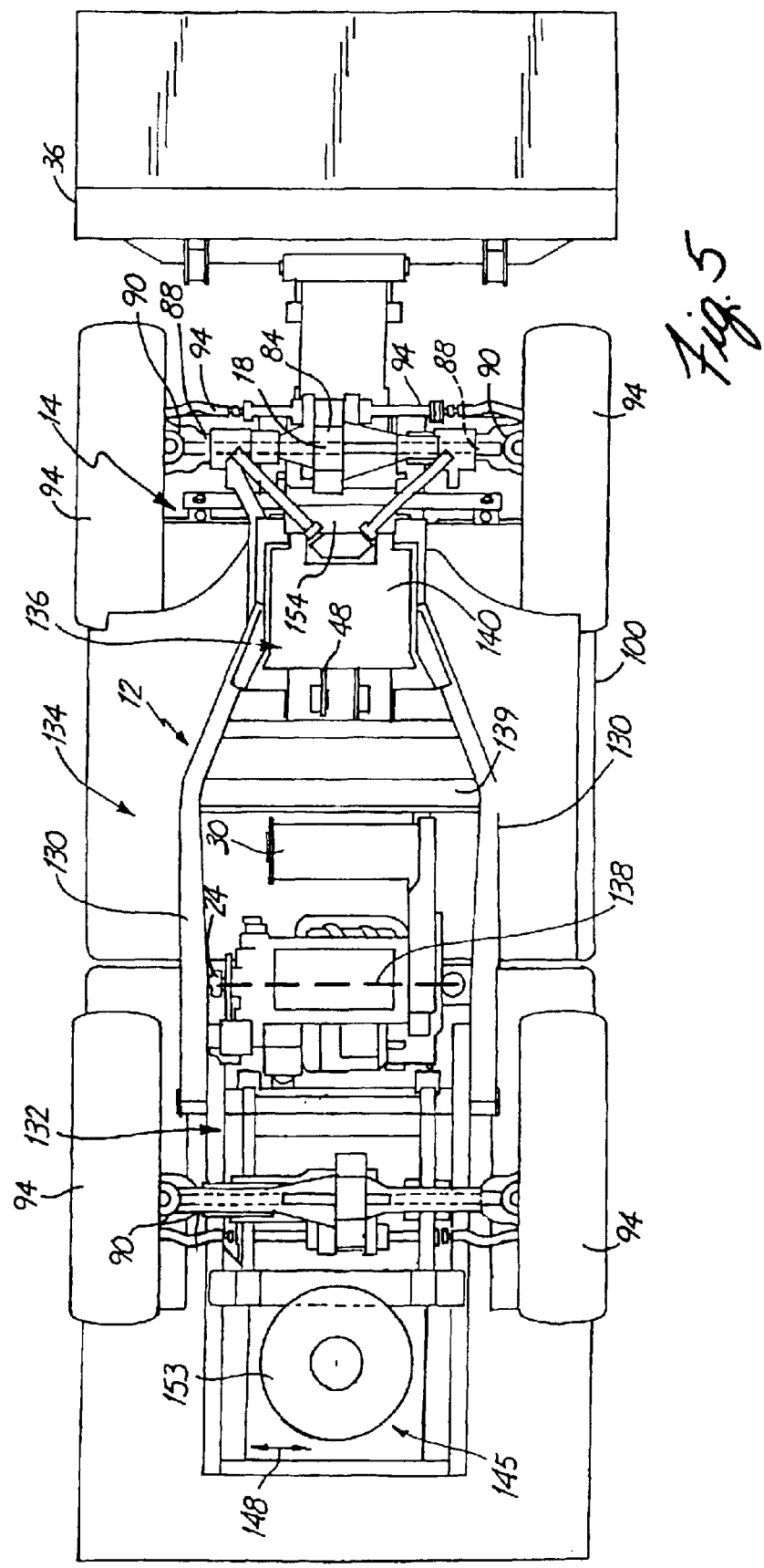
FIG. 5 is a bottom plan view of the wheeled work machine.

Referring to FIGS. 3 and 5, movement of the work machine 10 is provided by wheels 94 mounted on each of the wheel assemblies 18 and 20. Either or both of the wheel assemblies 18 and 20 can be powered by the engine 24, for example, by mechanical drive shafts, chains, belts or the like. In the embodiment illustrated, hydraulic drive motors are mounted to the housing assemblies 84, which in turn, drive the wheels 94. The drive housing assemblies 84 can be independent, i.e., one for any chosen wheel 94, or as illustrated, have opposed output shafts 88 to drive a pair of wheels 94.

The drive housing assemblies 84 can include gear reduction, wet disk brake, differential, differential lock and the output shafts 88. In one embodiment as illustrated, pivotal couplings 90 are provided at the ends of the drive housing assemblies 84 and are coupled to hub assemblies of the wheels 94 to allow the associated wheels 94 to pivot. Tie rods 94 coupled to a suitable steering mechanism having a steering wheel 98 (FIG. 1) proximate the operator platform 26 can control pivotal motion of the wheels 94. In the embodiment illustrated, each of the wheel assemblies 18 and 20 allow the corresponding wheels 94 to be pivoted providing for all-wheel steering capability resulting in a small turning diameter. Nevertheless, in an alternative embodiment, the steering mechanism can be coupled to only the front wheel assembly 18, or to only the rear assembly 20.

The steering mechanism for the front and/or rear wheels 94 can take any number of forms such as a mechanical linkage between the steering wheel 98 and the steerable wheels of the front wheel assembly 18 and/or rear wheel assembly 20. In the embodiment illustrated, the wheels are steered using hydraulic cylinders mounted to the drive housings. There can be a steering cylinder for each steerable wheel, or pairs of wheels can be steered with a single cylinder and a tie rod connection. The steering wheel 98 can be coupled to a steering sector to direct pressurized hydraulic fluid to the appropriate steering cylinders thus obtaining steering of the desired wheels. The steering modes can illustratively include front wheel steer, rear wheel steer, coordinated steer (in which the front and rear wheels are steered in pairs in opposite directions to implement tighter turns) and crab steer (in which the front rear wheels are again steered in pairs but in the same direction). A control valve can be further used in the hydraulic circuit of the rear wheels, wherein the control valve receives an input related to the type of steering desired for the rear wheels, e.g. coordinated or crab steer, and properly directs pressurized to the steering actuator based on the desired mode of steering. Allowing the work machine 10 to steer all of the wheels 94 significantly minimizes damage to the ground surface, which can occur during travel to the work site or operation of the work machine 10 at the job site.

In one embodiment, multiple seat positions can be provided through individual seats, as illustrated, or a common bench seat. Configured in this manner, the work machine 10 allows side-by-side seating positions for the transportation of two or more individuals to the job site. It should be further noted that the operator platform 26 is disposed on the frame assembly 12 between the wheel assemblies 18 and 20 so as to provide a stable platform. In the embodiment illustrated, the operator platform 26 forms part of an operator station 100 that can include a canopy 102. An exemplary construction of side panels for the operator station 100 is described in co-pending application "Side Panel Assembly for Wheeled Work Machine", Ser. No. 09/977,110, filed Oct. 12, 2001 and issued as U.S. Pat. No. 6,572,179. A windshield 104, back window 106 and doors (not shown) can also be provided in order to enclose the operator station 100, if desired.

An instrument cluster and dash 110 is generally disposed in front of the operator platform 26 and behind the boom pivot 16 and includes gauges, controls and the like for operation of the work machine 10. The instrument cluster and dash 110 is also disposed at a level such that an upper surface thereof allows an operator of height in the range of a female in the fifth percentile to a male in the ninety-fifth percentile to view an end of the lift arm 34 remote from the boom pivot 16.

The cargo support 28 located behind the operator platform 26 and supported by the frame assembly 12 allows the transportation of tools and/or other material to the job site. Although exemplified herein as a cargo box (open or enclosed), which can also tilt through a suitable lift cylinder and hinge coupling the cargo box to the frame assembly 12, which has a floor 120 and side walls 122 (with or without tailgates or side gates), the cargo support 28 can include other forms of containers or platforms. For instance, the cargo support can also include a sprayer having a suitable tank for containing liquid, a hopper such as for spreading sand, or a plurality of tool boxes to name a few.

Referring FIGS. 2 and 5, engine 24 is generally located behind operator platform 26 and below cargo support 28. In one embodiment, a transverse engine is supported by the frame assembly 12 at this location. The transverse engine 24 includes a crank shaft indicated by dashed line 138 oriented transversely with respect to a longitudinal axis (front to back) of the work machine 10. Although other orientations of engine 24 can be used, the transverse engine provides a compact assembly that can also be easily serviced.

Figure 4:
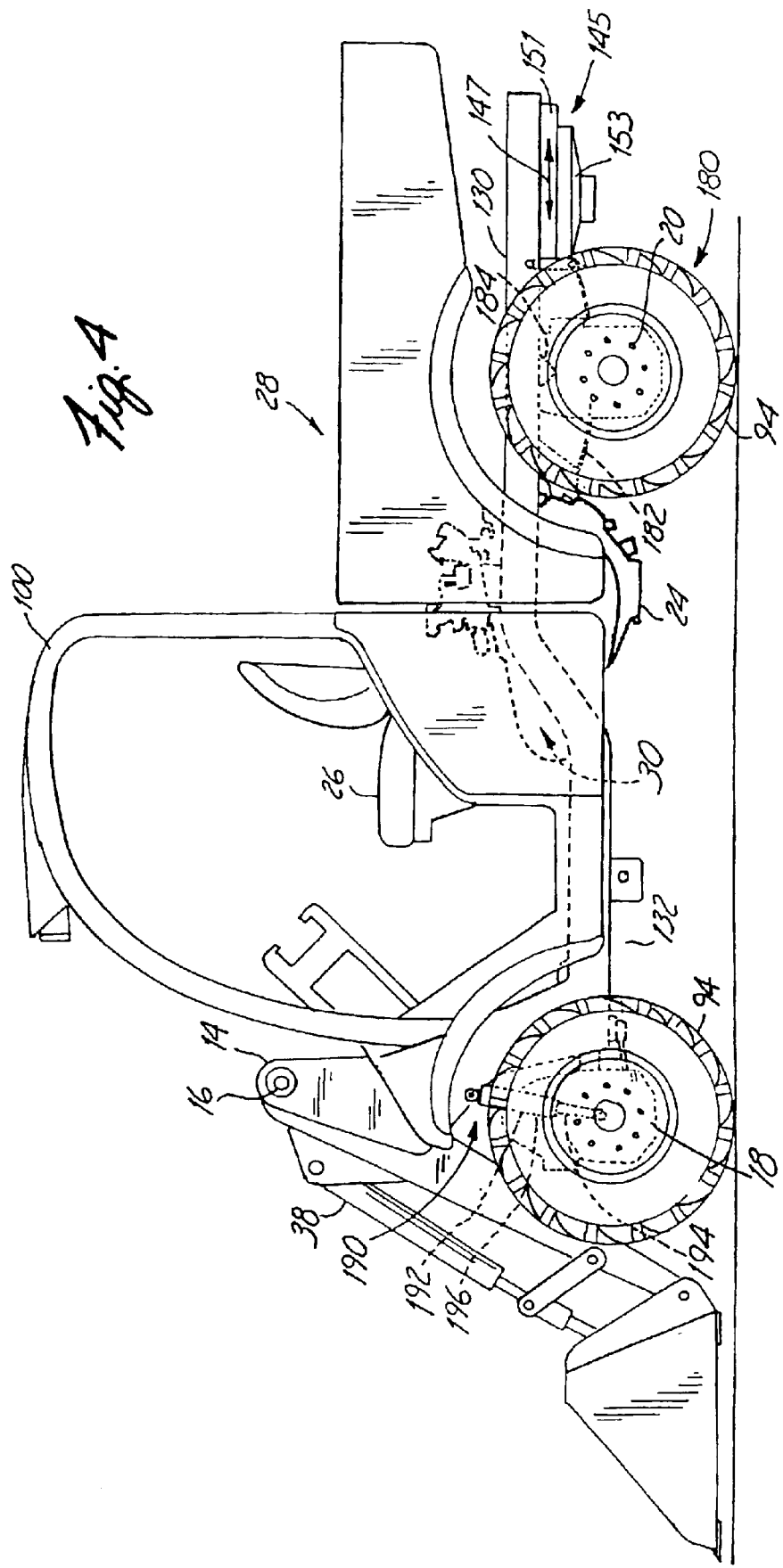
FIG. 4 is a side elevational view of the wheeled work machine with portions shown with dashed lines.

Also shown in FIGS. 2, 4 and 5 is a radiator assembly 145 for cooling engine 24. Radiator assembly 145 is supported at least partially beneath cargo support 28 by longitudinal frame members 130. In one embodiment, longitudinal frame members 130 are C-channel frame members (see for example FIG. 9). In these embodiments, radiator assembly 145 can be supported via positioning between, and within the C-channels of, frame members 130.

In the embodiment illustrated, radiator assembly 145 is supported by longitudinal frame members 130 behind the rear axle. This is shown in the FIGS. by placement of the radiator assembly behind rear wheel 94 or suspension assembly 180.

Radiator assembly 145 includes a radiator 151 and optionally one or more air flow generation device 153 such as a fan or other blower for removing heat energy by moving air past radiator 151. In the illustrated embodiments, radiator assembly 145 includes dual fans or air flow generation devices 153, with one positioned on top of radiator 151, and one positioned below radiator 151. In other embodiments, radiator assembly 145 and air flow generation devices 153 can be positioned elsewhere. Radiator assembly 145 also includes hoses 146 which carry coolant between engine 24 and radiator 151. Also, radiator assembly can include other features, for example an airflow redirecting structure or mechanism which redirects airflow from fans 153 toward the rear of the wheeled work machine in order to minimize dust in the area of operator station 100.

Radiator 151 is supported relative to longitudinal frame members 130 and the ground in a "flat" position in order to further facilitate the compact design of wheeled work machine 10. In other words, radiator 145 has a vertical dimension relative to the ground which is less than its longitudinal dimensions indicated generally at 147 and 148 in FIGS. 2, 4 and 5. Generally, radiator 151 is oriented with its longitudinal dimensions substantially parallel to the ground to give it a low profile. However, radiator 151 can also be oriented at slight angles relative to the ground, for example up to about 45° or less to create the exhaust. Including a flat radiator 151 for cooling of engine 24 allows the radiator to be supported by longitudinal frame members 130 beneath cargo support 28. In addition to saving space and facilitating a compact and stable wheeled work machine configuration, utilization of a flat radiator assembly 145 placed in this position can also serve to protect the radiator from damage relative to other potential locations on the wheeled work machine.

Figure 9:
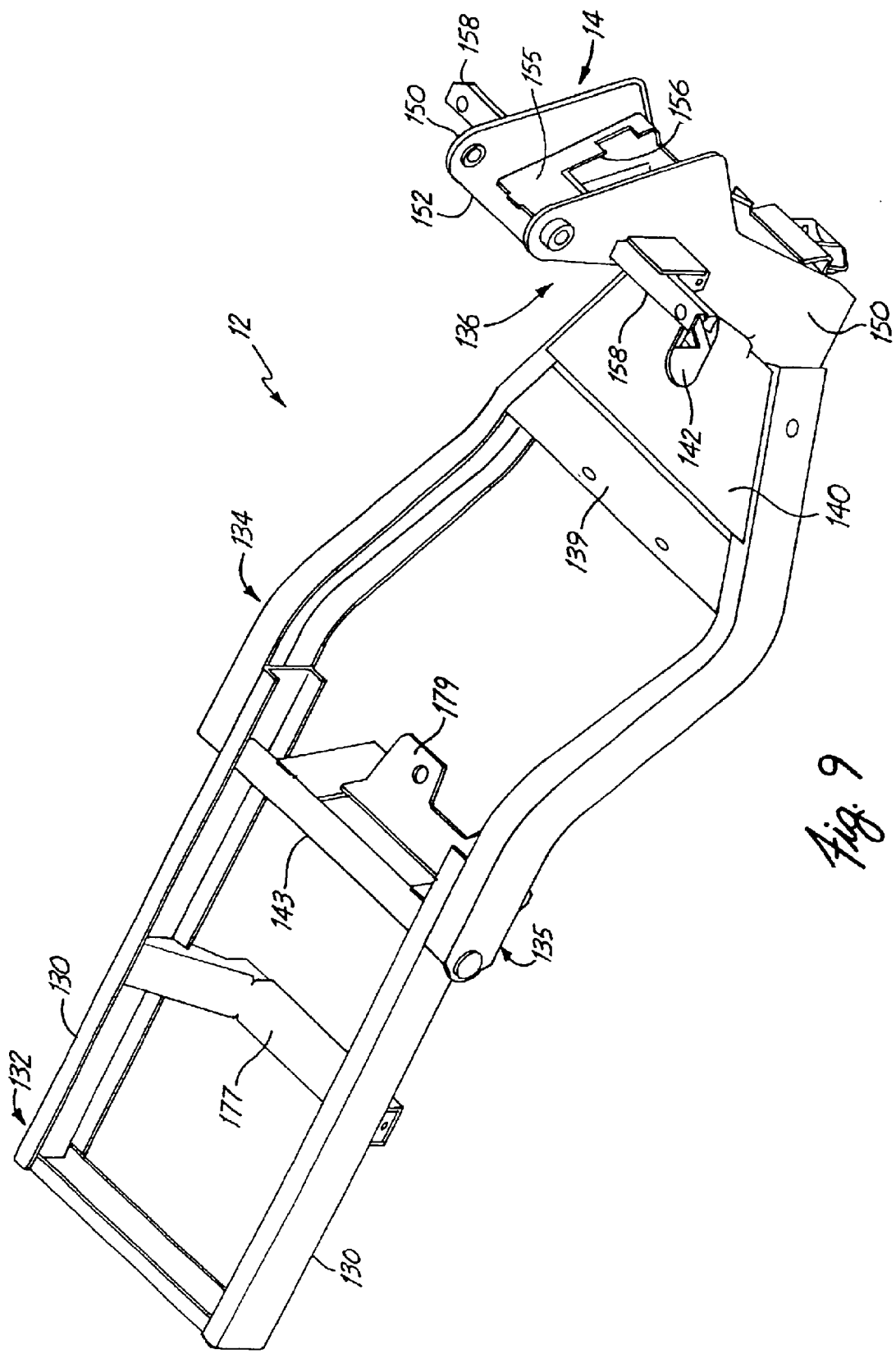
FIG. 9 is a perspective view of a frame assembly.
Figure 10:
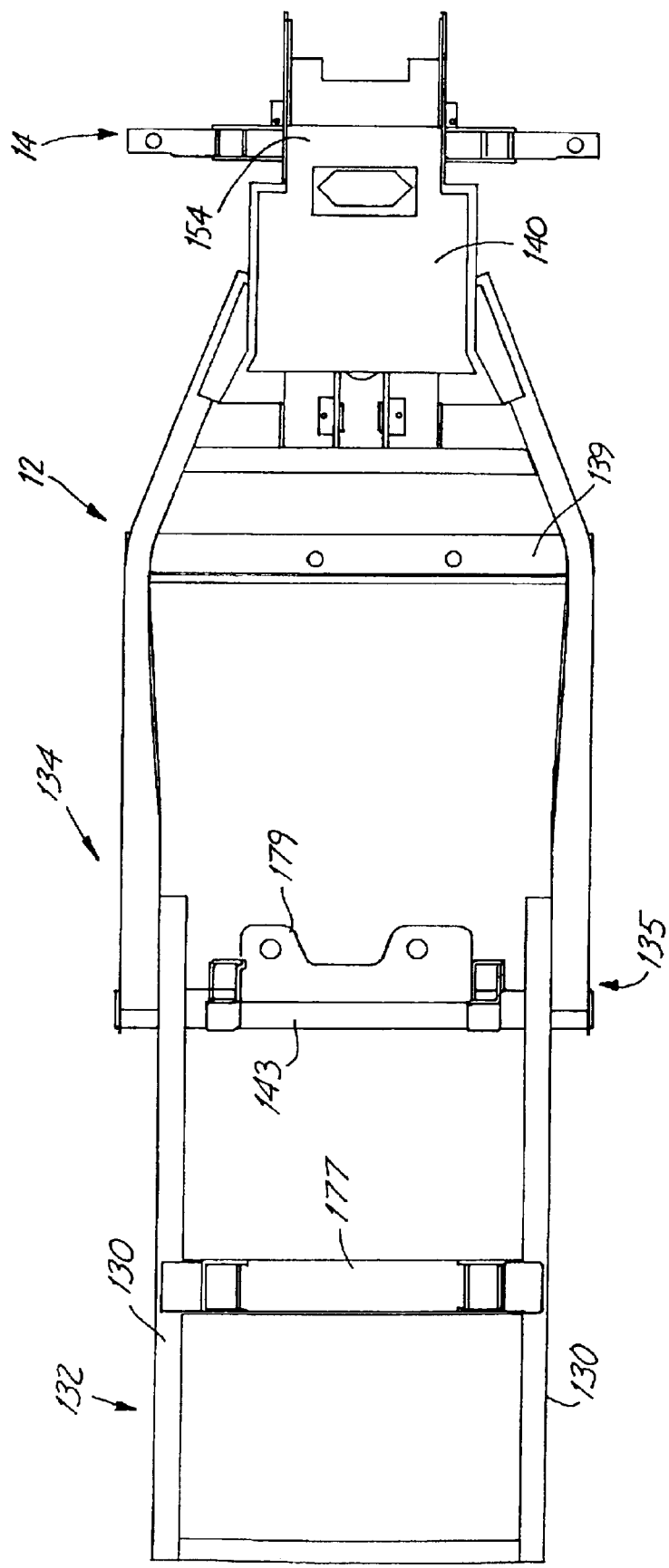
FIG. 10 is a bottom plan view of a frame assembly.

Referring now to FIGS. 5, 9 and 10, the frame assembly 12 is a "rigid" frame assembly wherein no frame articulation is provided between the front wheel assembly 18 and the rear assembly 20. In the embodiment illustrated, the frame assembly 12 includes longitudinal frame members 130 extending from the rear wheel assembly 20 toward the front wheel assembly 18. Generally the frame assembly 12 includes a cargo support portion 132, a middle portion 134 and a front or boom support portion 136. The portions 132, 134, 136 can be attached together as illustrated in FIG. 9 wherein cargo support portion 132 and middle portion 134 are generally attached and defined at connection 135, wherein longitudinal members 130 extend from front to back and are defined by longitudinal sections forming portions 132, 134 and 136. Alternatively, portions 132, 134, 136 may be integral. The cargo support portion 132 and the boom support portion 136 are not as wide as the middle portion 134. The narrower width of the cargo support portion 132 and the front or boom support portion 136 allows for increased pivoting of the wheels 94 for steering of either the front wheel assembly 18 and/or the rear wheel assembly 20. In contrast, the wider transverse width of the middle portion 134 allows accommodation of the transverse oriented engine 24 and provides a stable mount for the operator station 100.

In the embodiment illustrated, the front or boom support portion 136 is particularly strengthened so as to inhibit bending or twisting due to loads carried by the lift arm 34 such as with bucket 36. The front or boom support portion 136 can therefore include a plurality of transverse members 139 extending between the longitudinal members 130, or as illustrated herein, one or more plate members 140 to which the lift cylinder 32 is pivotally connected. An elongated aperture 142 can be provided in an upper plate member 140 as illustrated in FIG. 9 to accommodate pivoting motion of the lift cylinder 32 during operation thereof. Additional support and resistance against twist to the frame assembly 12 can result from a torque tube 143 being provided at or near the connection 135 of middle portion 134 and cargo support portion 132. As described below, transverse members 177, 179 provide support for rear suspension assembly 20.

The support 14 is joined to ends of the longitudinal 130 members and to the transverse ties or the plate members 140 as illustrated in FIGS. 9 and 10. Generally, the support 14 includes side plates 150, an upper back plate 152 and a lower front plate 154, both of which connect the side plates 150 together. An inclined connecting plate 155 can also be provided with an aperture 156 to allow the lift cylinder 34 to extend therethrough. Extending supports 158 can also be provided for support of the operation station 100 on elastomeric isolators, if desired. The operator station 100 can be supported on two additional elastomeric isolators at the rear, if desired. In this manner, the operator station 100 increases the strength of the boom support 14. It should be noted that although direct support for the operator station 100 is provided at supports 158 and at the rear of the frame 20, the operator platform 26 is nevertheless supported by the frame and disposed between the boom support 14 and the cargo support 28. It should be understood that the location of the mounts for operator station 100 and thus the operator platform 26 can occur anywhere on the frame 20.

Referring to FIG. 2, the longitudinal frame members 130 can extend below the operator station 100, and in particular, at a level below an upper surface 160 of the floor panel of the operator station 100 in order to allow easy entry and egress from the operator station 100. As further illustrated, each of the longitudinal frame members 130 can extend upwardly through the middle portion 134 and then over the rear drive assembly 20. In this manner, the operator station 100 and operator platform 26 can be lower so as to allow easy entry into and egress from the operator station 100 and provide a stable platform. Similarly, the front or boom support portion 136 extends at substantially the same level as the portion of the longitudinal frame members 130 below the upper surface 160 of the floor panel. As illustrated, the thickness of the longitudinal frame members 130 for the inclined portions of the middle portion 134 is greater than the thickness of the longitudinal members 130 in the cargo support portion 132 and front or boom support portion 136 so as to concentrate section modulus where needed in order to inhibit bending associating with heavy loads on the remote end of the lift arm 34. Alternatively, front portion 136 and middle portion 134 can be of increased height to concentrate section modulus where needed. Likewise, the height of the longitudinal frame members 130 in the cargo support portion 132 can be similar to the front portion 136 with only the inclined portions of middle portion 134 being of greater height. Although the frame assembly 12 has unique physical characteristics for the reasons discussed above, these physical characteristics can be included in numerous aesthetic designs.

In spite of the rigid frame assembly 12 described above, which is well suited for handling loading due to the lift arm 34, each of the wheel assemblies 18 and 20 can further include suspension assemblies allowing the smooth transportation of workers and materials to the job site. Referring to FIGS. 4 and 14, an exemplary suspension assembly 180 for the rear wheel assembly 20 can include a leaf spring or springs 182 connected at remote ends thereof to each of the longitudinal frame members 130. Opposed ends of the rear wheel assembly 20 are joined to a center portion of the leaf spring or springs 182. Leaf spring 182 is supported by members 177, 179 attached to the frame assembly 12. In the embodiment illustrated in FIGS. 9 and 14, member 177 is a transverse bracket extending across the cargo support portion 132, while member 179 is a bracket mounted to torque tube 143. Other suitable suspension elements that can be used include coiled springs, and the like, operably coupled between the rear wheel assembly 20 and the frame members 130.

If further desired, an overtravel assembly 184 can be provided and operable when substantial loads are carried by the work machine 10, for example, on the cargo support 28 when full deflection of the leaf spring or springs 182 is obtained. The overtravel assembly 184 can have a second spring rate stiffer than that of the leaf spring or springs 182 and can be operable only when a selected amount of deflection has been obtained. For instance, the second spring assembly 184 can comprise compressive, elastomeric stops that selectively engage portions of the rear drive assembly 20.

Schematically illustrated in FIG. 4, a suspension assembly 190 for each side of the front assembly 18 can include fluidic dampers 192 joined between the front wheel assembly 18 and the frame assembly 12. Coiled springs can also be provided. The fluidic damper 192 can include fluid chambers formed on opposite sides of a center piston in a suitable cylinder housing 196. Generally, the center piston or piston rod 194 is coupled to one of the front wheel assembly 18 or frame assembly 12, while the cylinder housing 196 is coupled to the other. During transportation to the job site, control valves such as check valves and/or pilot valves can be operated so as to allow fluid flow between the opposed fluidic chambers, wherein the fluid flow is restricted so as to provide damping. However, when it is desired to perform work using the lift arm 34, for example by picking up material with the bucket 36, the control valves for each of the suspension assemblies 198 for the front wheels 94 can be operated so as to substantially inhibit or prevent fluid flow in order to substantially hold the center piston in a substantially fixed position relative to the cylinder housing 196. In this manner, the suspension assemblies 190 are "locked" in order to prevent, or at least substantially inhibit, relative motion between the front wheel assembly 18 and the frame assembly 12. If desired, similar lockable suspension assemblies can also be provided between the frame assembly 12 and the rear wheel assembly 20.

Overview of Speed Control System

Figure 11:
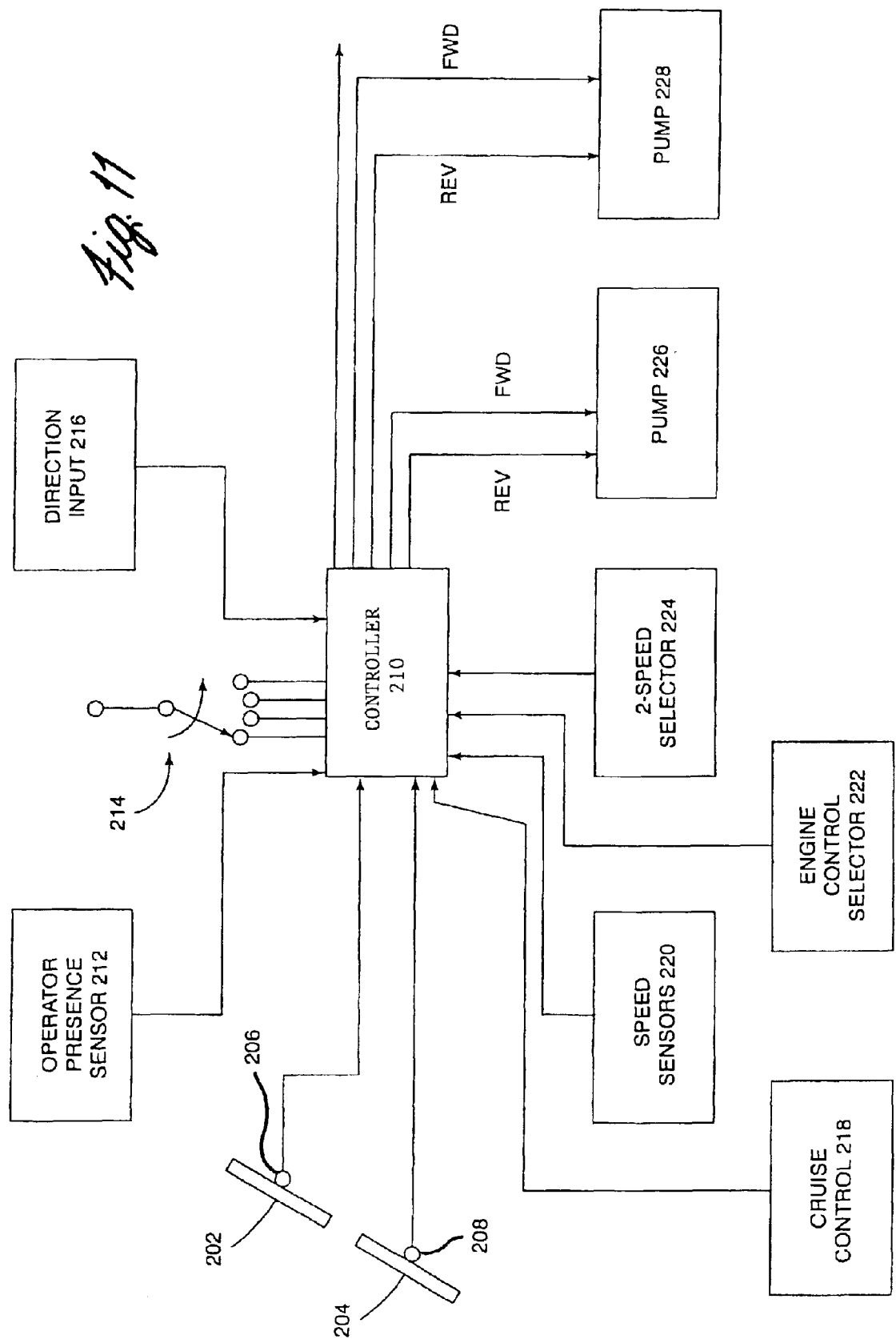
FIG. 11 is a block diagram of a control system.

FIG. 11 is a block diagram of a control system 200 for controlling a wheeled work machine, such as work machine 10. Control system 200 illustratively includes acceleration pedal 202, deceleration pedal 204, angle sensors 206 and 208 which are configured to sense the angle of deflection of pedals 202 and 204, respectively, and provide signals indicative thereof to controller 210. System 200 also includes an optional operator presence sensor 212, mode selector switch 214, direction input 216 which provides an input indicative of a desired direction of travel, cruise control select button 218, speed sensors 220 which are mounted to sense the speed of the front and/or rear wheels (or right and left wheels or one or all wheels), engine speed control mode selector 222, two speed selector 224, hydrostatic pump 226 for driving a hydraulic motor connected to the front wheels, and hydrostatic pump 228 for driving a hydraulic motor connected to the rear wheels.

A brief overview of the operation of control system 200 is first presented. Then, a number of the aspects of control system 200 will be described in greater detail. In operation, the user depresses acceleration pedal 202 to a desired deflection angle. That angle is sensed by angle sensor 206 and a signal indicative thereof is provided to controller 210. Controller 210 associates the deflection angle with a predetermined speed and provides an output to hydrostatic pumps 226 and 228 to drive the wheels of work machine 10 at the desired speed. Speed sensors 220 provide a signal indicative of the speed of the wheels to controller 210 such that controller 210 can operate in a closed loop manner.

As the user deflects pedal 202 to a greater or lesser deflection angle, that angle is again sensed by sensor 206 and provided to controller 210 which, in turn, controls hydrostatic pumps 226 and 228 to increase or decrease wheel speed accordingly.

Similarly, the user can rotate deceleration pedal 204 to a desired angle of deflection which is sensed by sensor 208. Sensor 208 provides a signal indicative thereof to controller 210. Controller 210 associates the deflection angle of pedal 204 with a predetermined rate of deceleration. In one illustrative embodiment, as the deflection angle of pedal 204 increases, the rate of deceleration increases.

Of course, machine 10 is also capable of traveling both in forward and reverse directions. The user can indicate this by selecting the direction through direction input 216. Direction input 216 may, illustratively, simply be a rocker switch, a rotary switch, a press button switch, etc. The direction input 216 provides a signal to controller 210 indicative of a desired forward or reverse direction of movement of the machine, and controller 210 controls hydrostatic pumps 226 and 228 accordingly, based upon the deflection angles of pedals 202 and 204.

Two speed selector 224 is also illustratively a user actuated switch, button, etc., which provides a signal to controller 210 indicative of actuation thereof. In this way, the user can select between operating in a high speed or a low speed mode. Of course, the user may also select between more than two modes, but only two are described herein for the sake of brevity. If the user selects a high speed mode through input 224, then maximum deflection of pedal 202 is associated with one maximum speed. However, when the user selects a low speed mode through input 224, then the maximum deflection angle of pedal 202 is associated with a second maximum speed, which is lower than the first maximum speed.

In accordance with one illustrative embodiment, the user can also control the speed in cruise control mode through cruise control actuator 218. As with the other user actuable inputs, actuator 218 can also be a switch of various types or a depressible button, etc. When this button is depressed, controller 210 controls hydrostatic pumps 226 and 228 to maintain the current speed of machine 10.

Controller 210 can also control the speed of the machine 10 independently of engine speed. For example, the engine powers pumps for a hydraulic power system which may power attachments to machine 10. If the user desires to slow the vehicle to a slower speed, but does not wish to reduce power to the attachments, then the user may not wish to have the engine speed slowed as well. In that case, the engine speed is controlled by a separate throttle. Therefore, the user can provide an input through actuator 222 indicating to controller 210 whether the user wishes controller 210 to control engine speed in accordance with vehicle travel speed. In order to do so, controller 210 provides an output signal to a commercially available electrically controlled engine to vary the engine speed as desired by the user.

Control system 200 can also illustratively incorporate an operator presence sensor 212. Operator presence sensor 212 can be configured in any number of known ways to sense the presence of an operator in the operator compartment of machine 10 and provide a signal to controller 210 indicative thereof. In one illustrative embodiment, certain functions of machine 10 can be enabled or locked out based on the signal from operator presence sensor 212.

In still another embodiment, controller 210 can be configured to control machine 10 in one of a variety of steering modes briefly mentioned earlier. In one illustrative embodiment, the wheels are independently steerable, or are steerable in pairs. In that instance, machine 10 can be steered in front wheel steer mode in which the front wheels are steered, rear wheel steer mode in which the rear wheels are steered, crab mode in which the front and rear wheels are all steered in the same direction, and coordinated steer mode in which the front and wheel are steered in opposite directions to accommodate tighter turns. In one illustrative embodiment, the operator can select the steering mode with mode selector switch 214 which is illustrated as a rotary switch, but can take the form of any desired operator input.

Machine Speed Control System in More Detail

Pedals 202 and 204 can illustratively be pedals which are biased in an rearwardly rotated position and depressed against the bias to a forwardly rotated position, of higher deflection. They can also be over center pedals or any other type of pedal configuration. Of course, pedals 202 and 204 can be replaced by levers, joysticks, or any other suitable user input mechanism.

Sensors 206 and 208 can be any type of sensor which can sense an angle of deflection of pedals 202 and 204 (or sense movement of another input mechanism). In one illustrative embodiment, sensors 206 and 208 are rotary potentiometers. Of course, they can be Hall effect sensor devices, or other devices as well.

Controller 210 can illustratively be a microcontroller, microprocessor, digital computer, an array of processors or similar controllers. Controller 210 has associated memory and receives electronic inputs and provides electronic outputs to various items to be controlled.

Hydrostatic pumps 226 and 228 are illustratively hydrostatic pumps which are controlled based on position of a swash plate. The swash plate is moved by an actuator controlled by controller 210. The position of the swash plate thus controls the rate of rotation of the wheels to which the motors associated with pumps 226 and 228 are connected.

Speed sensors 220 are illustratively angle encoders attached to the axles to which the wheels of machine 10 are mounted. Such sensors can be devices other than angle encoders, such as Hall effect sensors, etc.

In operation, as the pedals are deflected, controller 210 provides an electronic output to the actuators which move the swash plates associated with pumps 226 and 228 to control machine speed. In order to control the speed of machine 10 based on the input from accelerator pedal 202, controller 210 illustratively receives the signal from sensor 206 and, based on that signal, retrieves a speed set point from memory which is associated with the sensed angle of deflection. In one illustrative embodiment, the greater the angle of deflection of pedal 202, the greater the associated speed set point retrieved by controller 210.

Figure 12A:
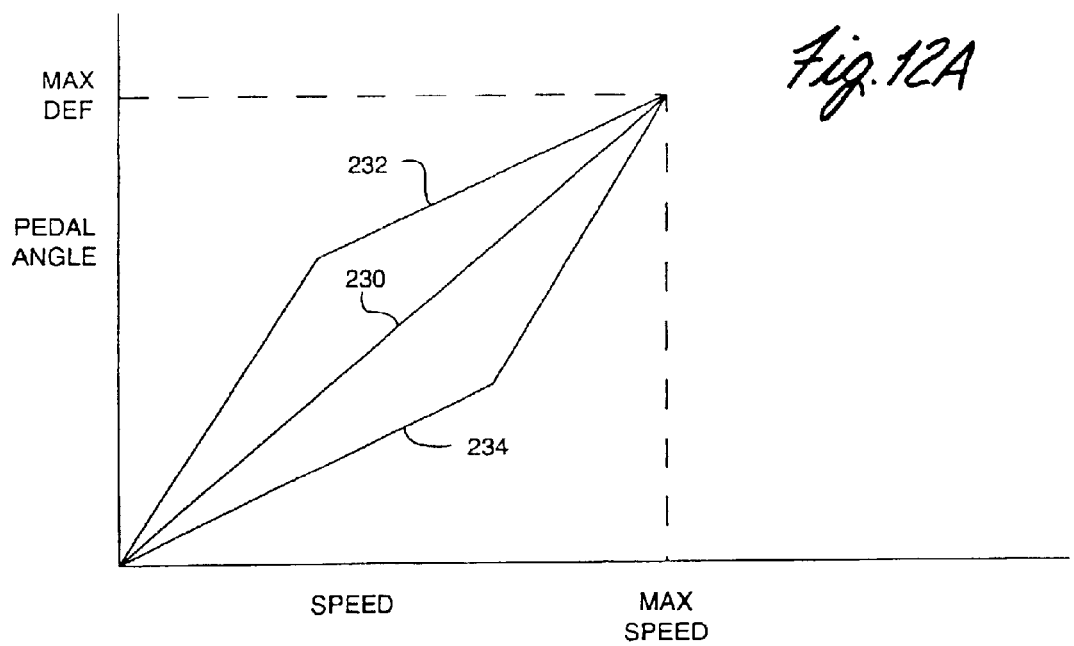
FIGS. 12A and 12B are graphs illustrating operation of an acceleration pedal.

Once the speed set point has been retrieved, controller 210 controls pumps 226 and 228 to accelerate from a current speed, to the speed set point along a predetermined acceleration curve. FIG. 12A illustrates a plurality of different illustrative acceleration curves. Such curves are designated by numerals 230, 232, and 234. FIG. 12A is a plot of accelerator pedal angle of deflection versus speed. FIG. 12A also shows the maximum pedal deflection and maximum speed.

In one embodiment, assuming the user has pressed pedal 202 to maximum deflection, controller 210 retrieves the maximum speed as the speed set point associated with maximum pedal deflection, and controls pumps 226 and 228 to accelerate from a stop to the maximum speed along curve 230. This is illustratively a linear acceleration from stop to the maximum speed. Of course, if the user only deflects pedal 202 partially, then that deflection can be mapped to a speed set point given curve 230, and controller 210 controls pumps 226 and 228 to accelerate to that speed along curve 230. If the user then increases the angle of deflection, controller 210 controls the pumps to increase machine speed again along acceleration curve 230.

Acceleration curves 232 and 234 illustrate that the acceleration curve need not be continuous, but can be discontinuous. For example, curve 232 illustrates that greater initial pedal deflection is required to achieve higher speeds. In contrast, curve 234 illustrates that controller 210 can control machine 10 to accelerate more quickly, with initial pedal deflection and more slowly with the greater angles of pedal deflection. Of course, acceleration curves can take any desired shape and curves 230, 232 and 234 are given for the sake of example only.

Figure 12B:
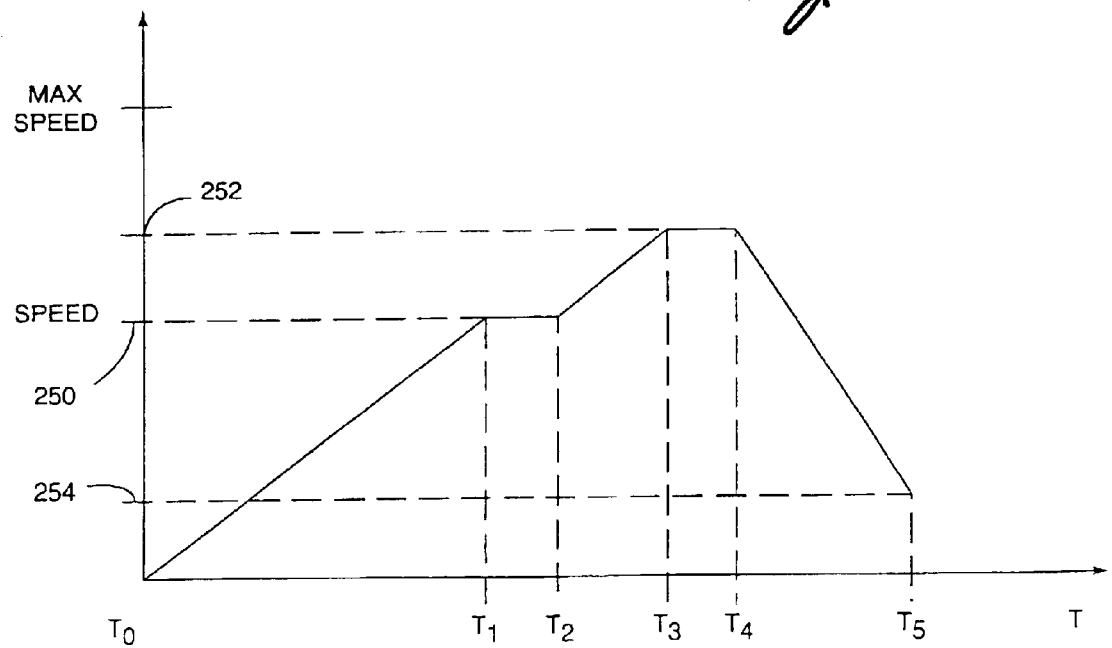

FIG. 12B in another graph illustrating operation of accelerator pedal 202. FIG. 12B is a graph of speed versus time and shows an exemplary speed versus time profile in order to illustrate a number of aspects of the present invention.

Assume, at time t0, machine 10 is stopped and the user deflects pedal 202 to a deflection angle corresponding to first speed set point 250. Controller 210 controls pumps 226 and 228 to accelerate machine 10 from zero speed to the first set point 250 between time t0 and time t1.

Next, assume that the operator maintains pedal 202 at that deflection angle for a period of time between t1 and t2. FIG. 12B shows that controller 210 maintains the speed at the first set point 250. Then, assume that the operator increases the deflection angle of pedal 202 to a second angle that corresponds to a second speed set point 252. Controller 210 again increases the speed of machine 10 between times t2 and t3. Note that the acceleration curves between times t0 and t1 and times t2 and t3 correspond to parallel lines. This indicates that controller 210 is controlling acceleration in the machine according to a linear rate of acceleration. Next, assume that the operator maintains the deflection angle of pedal 202 at the same angle between times t3 and t4. FIG. 12B illustrates that controller 210 maintains the speed of the machine at the second set point 252.

Now assume that the user reduces the angle of deflection of pedal 202 to a deflection angle associated with a third set point 254. Controller 210 controls the machine to decelerate according to a predetermined deceleration curve between times t4 and t5. The deceleration curve may have the same or different degree of slope as the acceleration curve. In addition, as is described below, the deceleration curve can be adjusted based on a user deflection of deceleration pedal 204.

Figure 12C:
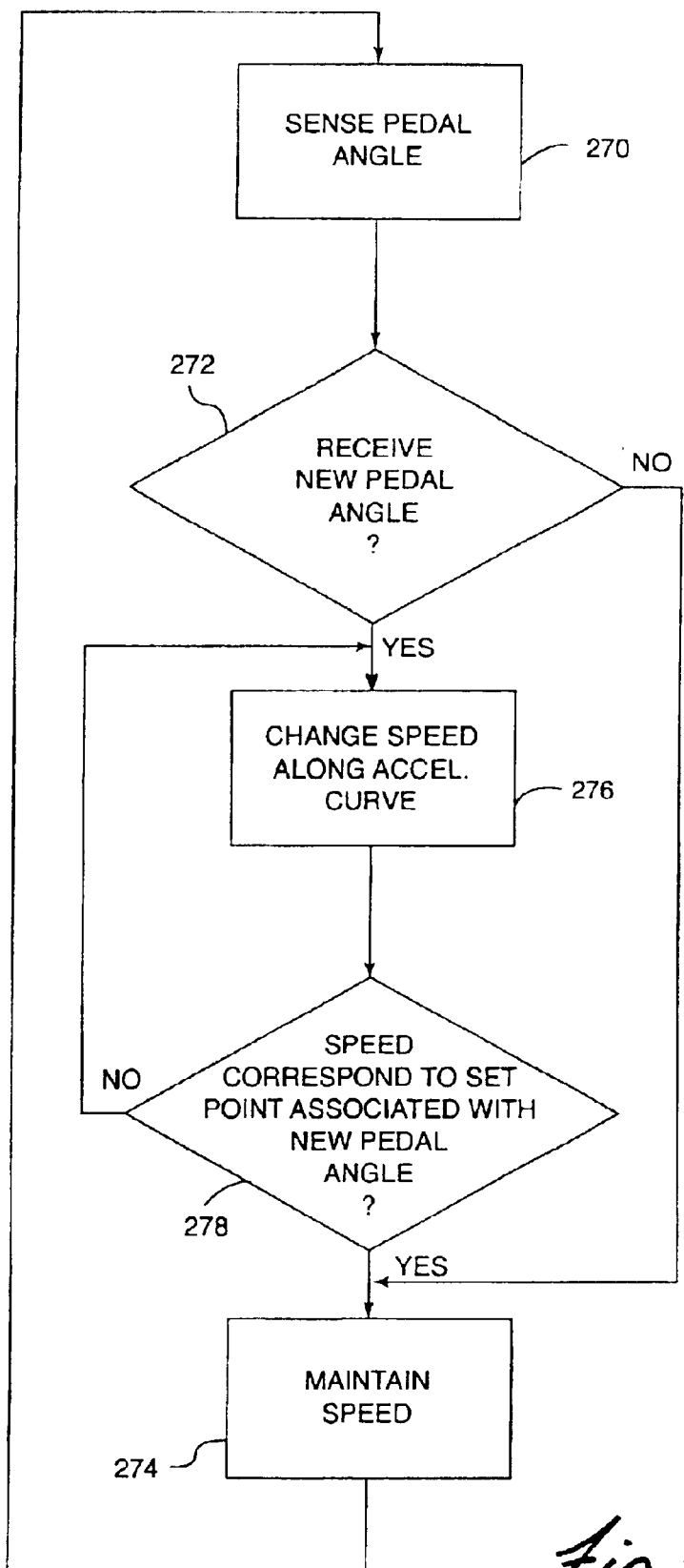
FIG. 12C is a flow diagram illustrating acceleration.

FIG. 12C is a flow diagram which illustrates the operation of acceleration pedal 202 in conjunction with controller 210. Controller 210 simply monitors the sensed angle of acceleration pedal 202. This is indicated by block 270. If the acceleration angle has not changed, as indicated by block 272, then controller 210 simply maintains the current speed as indicated by block 274 and continues to sense pedal angle at block 270. However, if at block 272 controller 210 determines that the pedal angle has changed, then controller 210 changes the speed of the machine along the predetermined acceleration curve as indicated by block 276. Controller 210 senses the speed of the machine through the signals provided by speed sensors 220 to determine when the machine has reached the desired set point. If the machine has not reached the desired set point, as indicated by block 278, controller 210 continues to increase the speed of the machine along the acceleration curve as indicated by block 276. However, once controller 210 senses that the speed of the machine has reached the desired set point, then controller 210 simply maintains that speed and monitors for further changes in the angle of deflection of the acceleration pedal.

Figure 13A:
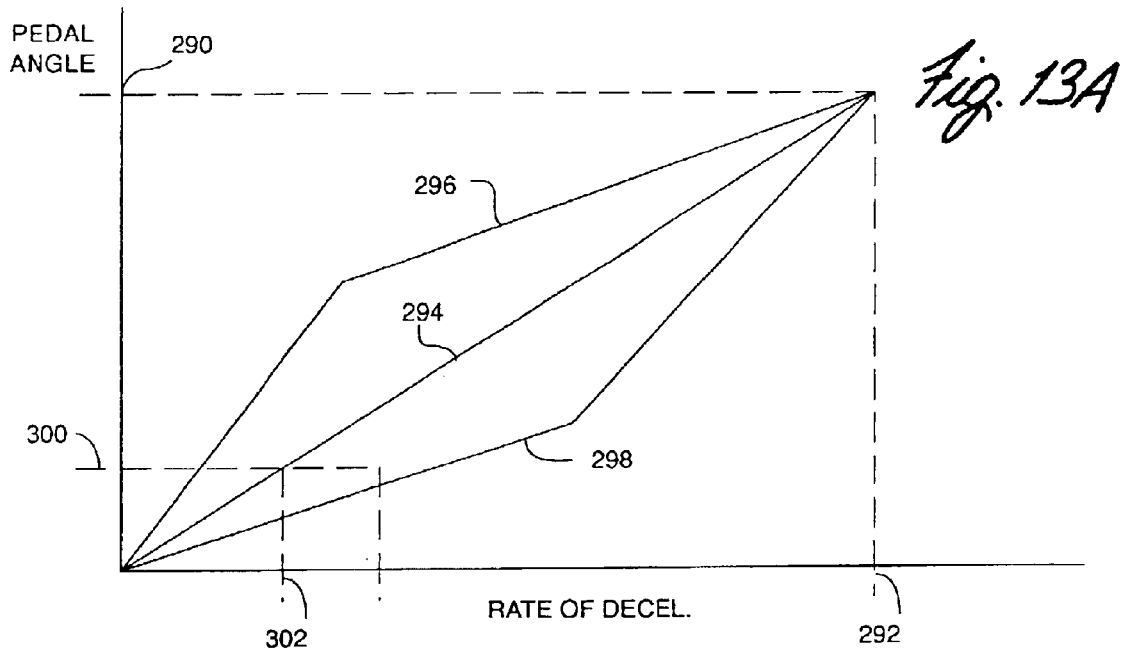
FIGS. 13A and 13B are graphs illustrating operation of a deceleration pedal.
Figure 13B:
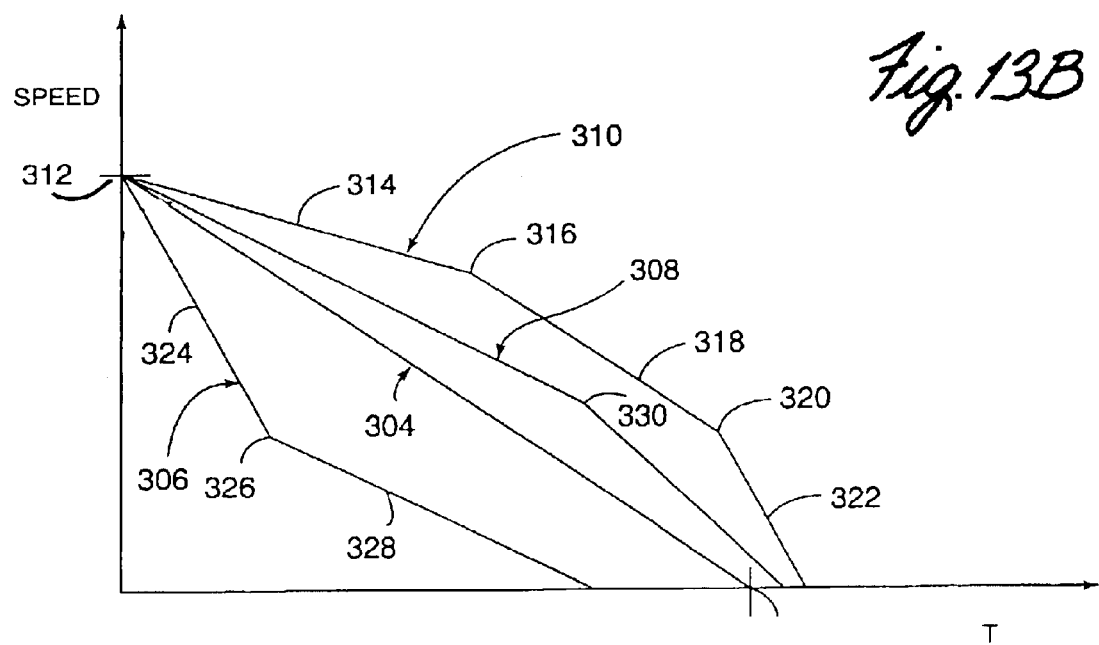

FIGS. 13A and 13B are graphs illustrating the operation of deceleration pedal 204. As the user increases the deflection angle of pedal 204, controller 210 destrokes pumps 226 and 228 according to a rate of deceleration corresponding to the angle of deflection of angle 204. Graph 13A graphs deceleration pedal angle against the rate of deceleration. Graph 13A also shows the point of maximum deflection 290 and the maximum rate of deceleration 292. FIG. 13A also illustrates a plurality of rate of deceleration curves 294, 296 and 298.

Therefore, assuming that the deceleration pedal 204 is in the completely non-deflected (neutral) position and the user moves it to deflection position 300, and assuming that the rate of deceleration curve being used by controller 210 is curve 294, then controller 210 controls pumps 226 and 228 to decelerate at a rate of deceleration 302. As the user increases deflection of pedal 204, controller 210 increases the rate of deceleration along curve 294. Of course, as the rate of deceleration increases, machine 10 slows more quickly.

FIG. 13A also illustrates that the rate of deceleration curve need not be linear, but can be discontinuous as shown by curves 296 and 298.

FIG. 13B is a graph of speed versus time further illustrating the operator of deceleration pedal 204. A number of different deceleration curves 304, 306, 308 and 310 are shown. The curves in FIG. 13B start at a machine current speed 312. Assume then that the user rotates pedal 204 from a non-deflected (neutral) position to a partially deflected position and holds pedal 204 in that position until the machine has been brought to a stop by controller 210. In that case, controller 210 obtains from memory the rate of deceleration curve associated with the deflection point and decelerates the machine according to that deceleration curve until it reaches zero. Such a curve may illustratively correspond to curve 304 in FIG. 13B in which the machine is linearly decelerated from speed 312 to a stop.

FIG. 13B also illustrates that the rate of deceleration changes with pedal deflection. For example, assume that the machine is traveling at speed 312 and the user partially deflects pedal 204. Controller 210 begins to decelerate machine 10 according to a first rate of deceleration illustrated by line segment 314. Then, assume that at shoulder 316 in curve 310, the user deflects pedal 204 further. Controller 210 then decelerates machine 10 at an increased rate illustrated by line segment 318. At shoulder 320, assume that the user further deflects pedal 204. Controller 210 then decelerates machine 10 according to an even more increased rate of deceleration illustrated by line segment 322.

Curve 306 is similar, except that the user initially deflects pedal 204 to a greater extent and controller 210 begins to decelerate machine 10 according to a rate of deceleration which is increased over that shown by line segment 314, and is instead indicated by line segment 324. At shoulder 326 in curve 306, the user eases off deceleration pedal 204 such that it is not deflected as far. Controller 210 then decelerates the machine 10 more slowly as indicated by line segment 328. Curve 308 is similar except that at shoulder 330 the user deflects the deceleration pedal 204 to a greater extent such that the rate of deceleration increases.

Figure 13C:
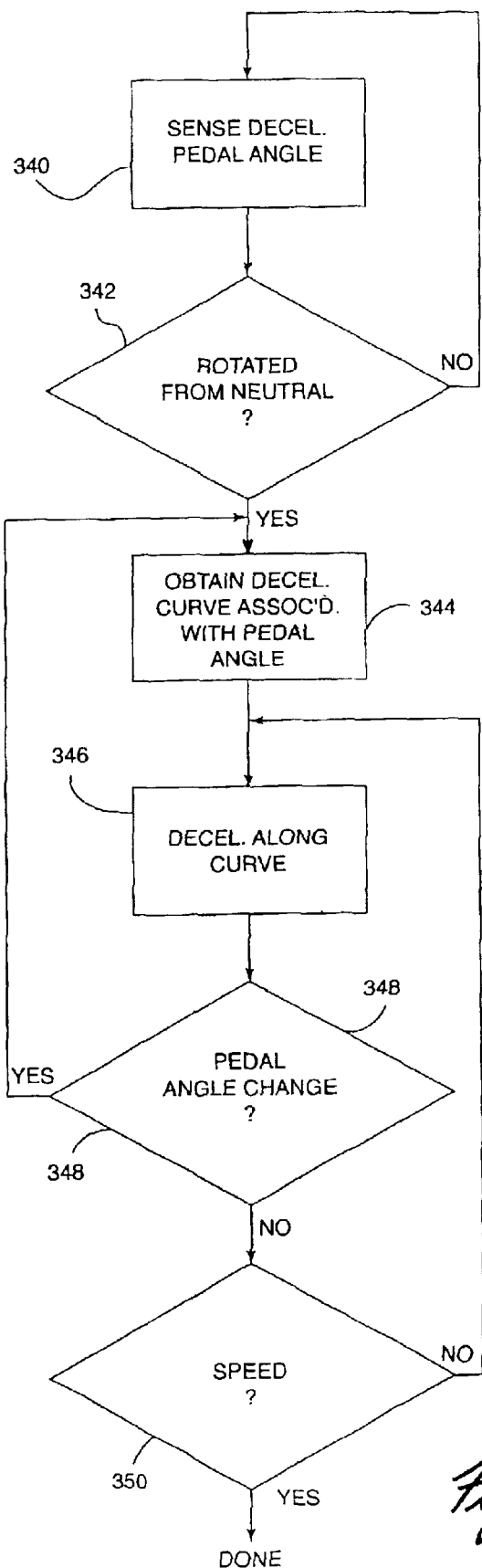
FIG. 13C is a flow diagram illustrating declaration.

FIG. 13C is a flow diagram further illustrating the operation of deceleration pedal 204. Controller 210 senses the pedal angle of deflection of deceleration pedal 204 as indicated at block 340. If the deceleration pedal 204 has not rotated from zero deflection (its undeflected or neutral position), as determined at block 342, then controller 210 simply continues to sense the pedal angle.

However, if at block 342 controller 210 has sensed a pedal angle deflection, then controller 210 obtains the deceleration curve associated with the angle of deflection of deceleration pedal 204. This is indicated by block 344. Controller 210 then begins to decelerate machine 10 according to the rate of deceleration associated with the deceleration pedal angle sensed. As vehicle 10 is being decelerated, controller 210 continues to monitor for changes in the position or deflection of deceleration pedal 204. This is indicated by block 348. If the pedal angle does change, then controller 210 obtains the deceleration curve associated with the new pedal angle and it decelerates machine 10 according to that curve. However, if the pedal angle of deceleration pedal 204 has not changed as determined at block 348, then controller 210 simply monitors the speed sensors 220 to determine whether the machine has stopped. If not, controller 210 simply continues to decelerate the machine at block 346 and monitors for other changes in the deflection angle of pedal 204. However, if, at block 350, it is determined that the machine has stopped, then the deceleration has been completed.

In another embodiment, if pedal 204 is rotated to a desired deflection angle, such as the maximum deflection angle, controller 210 decelerates the machine until it stops, and then applies a parking brake. In addition, in one embodiment, deceleration pedal 204 takes precedence over acceleration pedal 202. Therefore, even if the operator maintains acceleration pedal 202 in a deflected position, if the operator deflects pedal 204, controller 210 causes the machine to decelerate at a rate corresponding to the deflected position of pedal 204 and ignores the deflection of pedal 202.

If the user actuates two speed selector 224, in order to shift machine 10 from a low speed to a high speed operating mode, controller 210 controls machine 10 based on a number of factors. If pedal 202 is maintained in the same position before and after the user actuates selector 224, then controller 210 shifts the motors and destrokes pumps 226 and 228 and follows the acceleration rate curve associated with the new mode of operation. This allows smooth shifts without high horse power consumption.

If the user actuates selector 224 to change from a high speed mode to a low speed mode, and if pedal 202 is maintained in its current position, controller 210 controls the machine to follow the predetermined deceleration rate curve until the machine slows to the speed set point associated with the current angle of deflection of pedal 202 in the low speed mode. This allows for smooth shifts to low speed mode without abrupt decelerations. Also, illustratively, two speed mode is not allowed while the vehicle is traveling in reverse.

Controller 210 controls movement of machine 10 based on user actuation of cruise control input 218 in accordance with a number of factors as well. If the machine is in motion and the cruise actuator 218 is actuated by the user, then controller 210 maintains machine 10 at its current speed (or optionally at its current speed set point). If cruise actuator 218 has been actuated and acceleration pedal 202 is deflected, no action is taken by controller 210 until the deflection angle of pedal 202 has reached a position which corresponds to a speed set point which is above that of the current speed. In that case, the deflection of pedal 202 overrides the cruise control until pedal 202 is rotated back to a point below the cruise control speed. At that point, the original cruise control speed is resumed.

If the cruise control actuator 218 has been actuated and deceleration pedal 204 is rotated to a deflected (non-neutral) position, the cruise control mode is cancelled by controller 210 and the rate of deceleration corresponding to the position of pedal 204 is followed by controller 210.

In accordance with one illustrative embodiment, no cruise control is provided when machine 10 is in reverse. Also, in the cruise control mode, it should be noted that controller 210 can control input to a voltage level which is then being input by sensor 206. Therefore, during cruise control, pedal 202 is not locked or held, in anyway in any position. Instead, the user is free to manipulate pedal 202 as discussed above and controller 210 simply maintains at least the cruise control speed corresponding to the given voltage also as discussed above.

It can thus be seen that the present invention includes a number of features. In one embodiment, two pedal operation controls a hydrostatic transmission in a unique way. In addition, travel speed can be controlled independently of engine speed, or they can be controlled together, based on a user input. In yet another embodiment, cruise control is implemented which controls to a voltage instead of a mechanically or magnetically held pedal position. Similarly, on-the-fly shifting between high and low speed (or any number of speed) modes is accomplished by destroking the pumps, shifting the motors and restroking the pumps to desired positions in order to achieve smooth shifting.

Although the present invention has been described with reference to preferred embodiments, workers skilled in the art will recognize that changes may be made in form and detail without departing from the spirit and scope of the invention.

What is claimed is:

1. A method of controlling a hydrostatic motor configured to drive a wheeled work machine and to control speed of travel of the wheeled work machine having an electronic controller, an acceleration operator input mechanism operably coupled to the electronic controller, and a deceleration operator input mechanism operably coupled to the electronic controller, comprising:

sensing movement of the acceleration operator input mechanism from a first position associated with a first speed set point to a second position;

obtaining a second speed set point associated with the second position;

if the second speed set point is greater than the first speed set point, controlling the hydrostatic motor to accelerate the machine from the first speed set point to the second speed set point according to a predetermined acceleration curve;

sensing movement of the deceleration operator input mechanism from a neutral position to a first non-neutral position;

determining a rate of deceleration based on the non-neutral position of the deceleration operator input mechanism; and controlling the hydrostatic motor to decelerate the machine based on the rate of deceleration determined.

2. The method of claim 1 and further comprising:

if the second speed set point is less than the first speed set point, controlling the hydrostatic motor to decelerate the machine from the first speed set point to the second speed set point according to a predetermined deceleration curve.

3. The method of claim 1 wherein controlling the hydrostatic motor to accelerate comprises:

sensing machine speed; and comparing the sensed machine speed to the second speed set point.

4. The method of claim 1 wherein controlling the hydrostatic motor to decelerate comprises:

sensing machine speed; and controlling the hydrostatic motor to decelerate the machine until the sensed speed is zero.

5. The method of claim 1 and further comprising:

sensing actuation of an operator actuable cruise control input mechanism; and controlling the hydrostatic motor to maintain machine speed at least a current machine speed, regardless of whether the acceleration operator input mechanism is moved to a position corresponding to a speed set point that is less than the current machine speed.

6. The method of claim 1 and further comprising:

sensing operator actuation of a shift input mechanism indicative of a desired change to a new speed mode;

controlling the hydrostatic motor to change machine speed to a speed reflected by a new speed set point associated with a current position of the acceleration operator input mechanism; and controlling the hydrostatic motor to control machine speed according to a new acceleration curve corresponding to the new speed mode.

7. The method of claim 1 and further comprising:

receiving an engine speed selection input from an engine speed operator input mechanism; and controlling whether the engine speed is controlled independently of, or dependent on, machine speed, based on the engine speed selection input.

8. The method of claim 1 and further comprising:

varying the rate of deceleration based on sensed movement of the deceleration operator input mechanism relative to the neutral position.

9. The method of claim 8 wherein varying the rate of deceleration comprises:
- sensing movement of the deceleration operator input mechanism to a new non-neutral position;
- obtaining a new rate of deceleration based on the new non-neutral position; and
- controlling the hydrostatic motor to decelerate the machine based on the new rate of deceleration.

10. The method of claim 1 and further comprising:
- sensing actuation of an operator actuable cruise control input mechanism; and
- controlling the hydrostatic motor to maintain machine speed at least a current speed set point, regardless of whether the acceleration operator input mechanism is moved to a position corresponding to a speed set point that is less than the current speed set point.

11. The method of claim 10 and further comprising:
- if the acceleration operator input mechanism is moved to a position corresponding to a new speed set point that is greater than the current speed set point, controlling the hydrostatic motor to accelerate the machine from the current speed set point to the new speed set point.

12. The method of claim 11 and further comprising:
- if the deceleration operator input mechanism is moved from a neutral position, ignoring the cruise control input; and
- controlling the hydrostatic motor to decelerate the machine based on a position of the deceleration operator input mechanism.

13. A wheeled work machine, comprising:
- a frame;
- an operator compartment supported by the frame;
- a set of wheels coupled to the frame;
- a hydrostatic motor coupled to the wheels to drive the wheels and to control speed of travel of a wheeled work machine;
- an electronic controller;
- an acceleration operator input mechanism operably coupled to the electronic controller; and
- a deceleration operator input mechanism operably coupled to the electronic controller;
- wherein the controller is configured to sense movement of the acceleration operator input mechanism from a first position associated with a first speed set point to a second position, obtain a second speed set point associated with the second position, and if the second speed set point is greater than the first speed set point, provide a speed signal to the hydrostatic motor to control the hydrostatic motor to accelerate the machine from the first speed set point to the second speed set point according to a predetermined acceleration curve; and
- wherein the controller is further configured to sense movement of the deceleration operator input mechanism from a neutral position to a first non-neutral position;
- determine a rate of deceleration based on the non-neutral position of the deceleration operator input mechanism; and
- control the hydrostatic motor to decelerate the machine based on the rate of deceleration determined.

14. The wheeled work machine of claim 13 wherein the controller is further configured to determine whether the second speed set point is less than the first speed set point and, if so, control the hydrostatic motor to decelerate the machine from the first speed set point to the second speed set point according to a predetermined deceleration curve.

15. The wheeled work machine of claim 13 and further comprising:
- a machine speed sensor coupled to the controller and sensing machine speed; and
- wherein the controller is configured to compare the sensed machine speed to the second speed set point to control acceleration of the machine.

16. The wheeled work machine of claim 13 wherein the controller is further configured to control the hydrostatic motor to decelerate the machine by controlling the hydrostatic motor to decelerate the machine until the sensed machine speed is zero.

17. The wheeled work machine of claim 13 and further comprising:
- an operator actuable cruise control input mechanism; and
- wherein the controller is configured to control the hydrostatic motor to maintain machine speed at least a current machine speed, regardless of whether the acceleration operator input mechanism is moved to a position corresponding to a speed set point that is less than the current speed set point.

18. The wheeled work machine of claim 13 and further comprising:
- a shift input mechanism indicative of a desired change to a new speed mode; and
- wherein the controller is further configured to control the hydrostatic motor to change machine speed to a speed reflected by a new speed set point associated with a current position of the acceleration operator input mechanism, and control the hydrostatic motor to control machine speed according to a new acceleration curve corresponding to the new speed mode.

19. The wheeled work machine of claim 13 and further comprising:
- an engine speed operator input mechanism; and
- wherein the controller is further configured to control whether the engine speed is controlled independently of, or dependent on, machine speed, based on an input from the engine speed operator input mechanism.

20. The wheeled work machine of claim 13 wherein the controller is further configured to vary the rate of deceleration based on sensed movement of the deceleration operator input mechanism relative to the neutral position.

21. The wheeled work machine of claim 20 wherein the controller is configured to vary the rate of deceleration by sensing movement of the deceleration operator input mechanism to a new non-neutral position, obtaining a new rate of deceleration based on the new non-neutral position, and controlling the hydrostatic motor to decelerate the machine based on the new rate of deceleration.

22. The wheeled work machine of claim 13 and further comprising:
- an operator actuable cruise control input mechanism; and
- wherein the controller is configured to control the hydrostatic motor to maintain machine speed at least a current speed set point, regardless of whether the acceleration operator input mechanism is moved to a position corresponding to a speed set point that is less than the current speed set point.

23. The wheeled work machine of claim 22 wherein the controller is further configured to determine whether the acceleration operator input mechanism is moved to a position corresponding to a new speed set point that is greater than the current speed set point, and, if so, control the hydrostatic motor to accelerate the machine from the current speed set point to the new speed set point.

24. The wheeled work machine of claim 23 wherein the controller is further configured to determine whether the deceleration operator input mechanism is moved from a neutral position, and, if so, ignore the cruise control input and control the hydrostatic motor to decelerate the machine based on a position of the deceleration operator input mechanism.

* * * * *

UNITED STATES PATENT AND TRADEMARK OFFICE
CERTIFICATE OF CORRECTION

PATENT NO. : 6,896,088 B2
DATED : May 24, 2005
INVENTOR(S) : Jeffrey A. Dahl et al.

It is certified that error appears in the above-identified patent and that said Letters Patent is hereby corrected as shown below:

Title page,
Item [75], Inventor, please delete "Jeffery" and insert -- Jeffrey --.

Signed and Sealed this

Nineteenth Day of July, 2005

JON W. DUDAS
*Director of the United States Patent and Trademark Office*